US012478720B2

(12) United States Patent
Boire

(10) Patent No.: US 12,478,720 B2
(45) Date of Patent: *Nov. 25, 2025

(54) POLYMERIC VASCULAR GRAFTS WHICH INDUCE NEOVASCULARIZATION WITH MILD TO MINIMAL INFLAMMATION AND PROMOTION OF FIBROVASCULAR TISSUE

(71) Applicant: VenoStent, Inc., Houston, TX (US)

(72) Inventor: Timothy C. Boire, Houston, TX (US)

(73) Assignee: VenoStent, Inc., Houston, TX (US)

( * ) Notice: Subject to any disclaimer, the term of this patent is extended or adjusted under 35 U.S.C. 154(b) by 911 days.

This patent is subject to a terminal disclaimer.

(21) Appl. No.: 17/709,095

(22) Filed: Mar. 30, 2022

(65) Prior Publication Data
US 2022/0218882 A1    Jul. 14, 2022

Related U.S. Application Data

(63) Continuation-in-part of application No. 16/824,674, filed on Mar. 19, 2020, now Pat. No. 11,305,039.

(60) Provisional application No. 62/820,785, filed on Mar. 19, 2019.

(51) Int. Cl.
A61M 1/36     (2006.01)
A61L 31/06    (2006.01)
A61L 31/14    (2006.01)

(52) U.S. Cl.
CPC .......... *A61M 1/3655* (2013.01); *A61L 31/06* (2013.01); *A61L 31/146* (2013.01)

(58) Field of Classification Search
CPC .................................................. A61M 1/3655
See application file for complete search history.

(56) References Cited

U.S. PATENT DOCUMENTS 11,305,039 B2 *  4/2022  Boire .................... A61L 31/148

OTHER PUBLICATIONS

Woodward et al, Porous PCL-PCLA Semi-IPNs as Superior, Defect-Specific Scaffolds with Potential for Cranial Bone Defect Repair, Biomacromolecules: 16(12), 4075-4083. (Year: 2017).*

* cited by examiner

*Primary Examiner* — Carlos A Azpuru
(74) *Attorney, Agent, or Firm* — Patterson Intellectual Property Law, P.C.; Mark A. Kilgore

(57) ABSTRACT

The present invention relates generally to shape memory polymer devices that are porous. The porosity of the device may generate advantageous neovascularization, decrease inflammation, and decrease fibrosis. The device may include a surface having a pore size of 400 μm-1200 μm and a pore spacing of about 100 μm to about 750 μm.

20 Claims, 20 Drawing Sheets

| Score | 0 | 1 | 2 | 3 |
|---|---|---|---|---|
| Neovascularization | No blood vessels present | Vessels only at periphery | Vessels Present within interstices but not bridging | Vessels bridge implant in at least one focus |
| Fibrogenesis | Connective tissue bridges implant in multiple foci | Connective tissue bridges implant focally | Fibrosis at periphery beginning to invest interstices | Peripheral fibrosis only |
| Inflammation | Marked: Inflammation consists of a thick, circumferential cuff of neutrophils, multinucleated giant cells, histiocytes, lymphocytes, and plasma cells | Moderate: Inflammation consists of moderate, multifocal/segmented aggregation of multinucleated giant cells, histiocytes, lymphocytes, and plasma cells with fewer neutrophils | Mild: Inflammation consists of mild, multifocal/segmental aggregates of multinucleated giant cells, histiocytes, lymphocytes, and plasma cells with fewer neuthrophils; >50% of implant's circumference is affected | Minimal: Inflammation consists of mild, multifocal aggregates of multinucleated giant cells, histiocytes, lymphocytes, and plasma cells with infrequent neutrophils; <50% of implant's circumference is affected. |

Fig. 4

| Design | Diameter (μm) | Spacing (μm) | Void Area (mm² x 10³) | Porosity (%) |
|---|---|---|---|---|
| 1A | 273 ± 42 | 198 ± 68 | ~117 | ~30 |
| 2A | 658 ± 26 | 152 ± 46 | ~680 | ~60 |
| 3A | 1040 ± 25 | 124 ± 29 | ~1700 | ~72 |
| 1B | 320 ± 17 | 220 ± 35 | ~160 | ~32 |
| 2B | 671 ± 20 | 225 ± 51 | ~710 | ~51 |
| 3B | 1100 ± 29 | 243 ± 89 | ~1900 | ~61 |
| A | 273, 658, 1040 | 172 ± 54 (198, 152, 124) | ~117, 680, 1700 | 30, 60, 72 |
| B | 320, 671, 1100 | 224 ± 56 (220, 225, 243) | ~160, 710, 1900 | 32, 51, 61 |
| 1 | 293 ± 41 (273, 320) | 198, 220 | ~117, 160 | 30, 32 |
| 2 | 665 ± 24 (658, 671) | 152, 225 | ~680, 710 | 60, 51 |
| 3 | 1067 ± 35 (1040, 1100) | 124, 243 | ~1700, 1900 | 72, 61 |

| Design | Polymer | Pore Diameter (µm) | Spacing (µm) | Estimated Void Area (mm² x 10³) | Estimated Porosity (%) | E₀(37°C) (MPa) | ε_max (%) | σ_max (MPa) |
|---|---|---|---|---|---|---|---|---|
| A | 68%PCL-32%ACPCL | 627 ± 50 | 148 ± 45 | ~620 | ~59 | 0.92 ± 0.26 | 60.0 ± 13 | 0.15 ± 0.03 |
| B | 68%PCL-32%ACPCL | 1180 ± 78 | 155 ± 52 | ~2200 | ~71 | 0.57 ± 0.25 | 106 ± 17 | 0.17 ± 0.02 |
| C | 68%PCL-32%ACPCL | 640 ± 71 | 223 ± 42 | ~640 | ~50 | 1.08 ± 0.50 | 78 ± 65 | 0.26 ± 0.06 |
| D | 68%PCL-32%ACPCL | 1140 ± 86 | 226 ± 58 | ~2000 | ~62 | 1.11 ± 0.12 | 76 ± 46 | 0.29 ± 0.08 |
| E | 68%PCL-32%ACPCL | Non/micro | N/A | N/A | N/A | 2.4 ± 0.86 | 52 ± 30 | 0.44 ± 0.09 |
| F | GORETEX (ePTFE) | 10 – 30 µm[1] | N/A | N/A | N/A | 15.5 ± 1.8[1] | 139 ± 11[1] | 24.3 ± 1.8[1] |
| 150 | 68%PCL-32%ACPCL | 635, 1160 | 151 ± 50 | ~620, 2200 | ~59, 71 | 0.9, 0.57 | 60, 110 | 0.16 |
| 230 | 68%PCL-32%ACPCL | 635, 1160 | 229 ± 51 | ~640, 2000 | ~50, 62 | 1.1 | 78, 72 | 0.26 |
| 640 | 68%PCL-32%ACPCL | 635 ± 63 | 151, 229 | ~630 | ~59, 50 | 0.92, 1.1 | 60, 78 | 0.15, 0.26 |
| 1160 | 68%PCL-32%ACPCL | 1160 ± 64 | 151, 229 | ~2100 | ~71, 62 | 0.57, 1.1 | 110, 72 | 0.17, 0.26 |
| 0 – 30 | PCL-ACPCL, ePTFE | 0 – 30 | N/A | N/A | N/A | 2.4, 15.5 | 52, 139 | 0.44, 24.3 |

Fig. 8

|  | Pore Spacing | | | Pore Size | | |
| --- | --- | --- | --- | --- | --- | --- |
| Design Compared | Mean Difference | Significant? | Adjusted P value | Mean Difference | Significant? | Adjusted P value |
| A vs. B | -7.172 | No | 0.2963 | -554.8 | Yes (****) | <0.0001 |
| A vs. C | -75.26 | Yes (****) | <0.0001 | -13.44 | No | 0.2759 |
| A vs. D | -87.99 | Yes (**) | <0.0001 | -513.9 | Yes (**) | <0.0001 |
| B vs. C | -68.09 | Yes (**) | <0.0001 | 541.4 | Yes (**) | <0.0001 |
| B vs. D | -80.82 | Yes (****) | <0.0001 | 40.95 | No | 0.0682 |
| C vs. D | -12.73 | No | 0.1027 | -500.4 | Yes (****) | <0.0001 |

Fig. 10

|  | Peri-polymer localization | Other cells labeled |
|---|---|---|
| MMP3 | Monocyte-macrophages<br>Multinucleated giant cells<br>Endothelium | Dermal monocyte-macrophages<br>Neutrophils<br>Epidermal sebocytes<br>Striated myocytes |
| MMP9 | Monocyte-macrophages<br>Multinucleated giant cells | Dermal monocyte-macrophages<br>Neutrophils |
| MMP12 | Monocyte-macrophages<br>Multinucleated giant cells<br>Endothelium<br>Fibroblasts | Striated myocyes<br>Apocrine epithelial cells<br>Epidermal sebocytes<br>Dermal macrophages<br>Neutrophils<br>Epidermal keratinocytes |
| MMP13 | Monocyte-macrophages<br>Multinucleated giant cells | Dermal monocyte-macrophages<br>Neutrophils |
| MMP14 | Monocyte-macrophages<br>Multinucleated giant cells<br>Endothelium | Dermal monocyte-macrophages<br>Neutrophils<br>Epidermal sebocytes<br>Striated myocytes<br>Epidermal keratinocytes |

Fig. 14

| Pairwise Comparison | MMP-2 Δ[a] | p[b] | MMP-3 Δ | P | MMP-8 Δ | p | MMP-9 Δ | p | MMP-12 Δ | p | MMP-13 Δ | p | MMP-14 Δ | p |
|---|---|---|---|---|---|---|---|---|---|---|---|---|---|---|
| D vs. E | -0.701 | 0.891 | -1.37 | 0.743 | -1.12 | 0.753 | 0.795 | 0.909 | 3.45 | 0.420 | 1.64 | 0.693 | -1.92 | 0.304 |
| D vs. A | -0.0476 | 0.985 | 1.27 | 0.762 | 1.69 | 0.613 | 1.292 | 0.840 | 0.348 | 0.930 | 1.53 | 0.600 | -0.420 | 0.820 |
| E vs. F | 0.553 | 0.906 | 0.0459 | 0.991 | 0.947 | 0.769 | 0.288 | 0.918 | -0.167 | 0.976 | -0.130 | 0.974 | 0.992 | 0.430 |
| D vs. B | 0.502 | 0.828 | -1.10 | 0.792 | 1.49 | 0.650 | 1.54 | 0.802 | 0.434 | 0.887 | 2.04 | 0.498 | -0.693 | 0.717 |
| A vs. C | 0.0747 | 0.970 | -1.05 | 0.692 | -1.14 | 0.702 | 0.285 | 0.897 | 0.00768 | 0.998 | 0.306 | 0.873 | -0.241 | 0.872 |
| D vs. C | 0.0271 | 0.993 | 0.211 | 0.965 | 0.545 | 0.886 | 1.58 | 0.800 | 0.341 | 0.899 | 1.84 | 0.581 | -0.661 | 0.723 |
| A vs. B | 0.549 | 0.581 | -2.37 | 0.378 | -0.197 | 0.944 | 0.248 | 0.897 | 0.0855 | 0.982 | 0.512 | 0.594 | -0.274 | 0.860 |
| F vs. A | 0.101 | 0.896 | 2.59 | 0.497 | 1.86 | 0.537 | 0.208 | 0.914 | -2.93 | 0.546 | 0.0242 | 0.991 | 0.507 | 0.735 |
| D vs. F | -0.149 | 0.950 | -1.33 | 0.792 | -0.178 | 0.965 | 1.08 | 0.863 | 3.28 | 0.482 | 1.51 | 0.650 | -0.927 | 0.628 |
| Mean p | | 0.889 | | 0.735 | | 0.758 | | 0.871 | | 0.791 | | 0.717 | | 0.677 |
| Mean Δ | 0.300 | | 1.26 | | 1.02 | | 0.813 | | 1.227 | | 1.06 | | 0.737 | |
| Rank[c] | 7 | 7 | 2 | 5 | 4 | 4 | 6 | 5 | 5 | 2 | 2 | 3 | 6 | 1 |
| Mean Rank[d] | 7 | | 3.5 | | 4 | | 5.5 | | 3.5 | | 2.5 | | 3.5 | |
| A,B vs. C,D | -0.214 | 0.872 | 0.0227 | 0.994 | -1.32 | 0.460 | -0.627 | 0.833 | -0.221 | 0.909 | -0.868 | 0.632 | 0.226 | 0.845 |
| E,F vs. C,D | 0.438 | 0.848 | 1.45 | 0.515 | 0.924 | 0.656 | -0.152 | 0.965 | 3.19 | 0.176 | -0.653 | 0.783 | 1.09 | 0.334 |
| A,B vs. E,F | -0.652 | 0.735 | -1.43 | 0.525 | -2.24 | 0.212 | -0.476 | 0.722 | 2.97 | 0.226 | -0.215 | 0.899 | -0.867 | 0.371 |
| Mean p | | 0.818 | | 0.678 | | 0.443 | | 0.834 | | 0.437 | | 0.771 | | 0.517 |
| Mean Δ | 0.254 | | 1.319 | | 0.863 | | 0.673 | | 1.61 | | 0.923 | | 0.632 | |
| Rank | 7 | 6 | 2 | 4 | 4 | 2 | 5 | 7 | 1 | 1 | 5 | 3 | 6 | 3 |
| Mean Rank | 6.5 | | 3 | | 3 | | 6 | | 1 | | 4 | | 4.5 | |
| Total Rank[e] | 6.75 | | 3.25 | | 3.50 | | 5.75 | | 2.25 | | 3.25 | | 4.00 | |

[a] Δ = fold-change
[b] p = corrected p-value
[c] Rank = fold-change rank from highest (1) to lowest (7); p-value rank from lowest (1) to highest (7).
[d] Mean Rank = average of fold-change and p-value ranks
[e] Total Rank = average of Mean ranks for the 9 individual comparisons and 3 paired comparisons.

Fig. 15

| Fold-change (p-value) | Protein | Gene | Protein ID | UniProtKB link | Biological Function |
|---|---|---|---|---|---|
| Upregulated by SMP Macroporous Scaffolds | | | | | |
| 3.92 (0.1197) | Phenylalanine–tRNA ligase beta subunit | Farsb | Q9WUA2 (SYFB_MOUSE) | https://... | Protein heterotetramerization (part of cellular component biogenesis); phenylalanyl-tRNA aminoacylation (part of protein translation and gene expression). |
| 3.08 (0.0826) | Macrophage metalloelastase | Mmp12 | P34960 (MMP12_MOUSE) | https://... | Possible role in tissue injury and remodeling, processes significant chemotactic activity. Positive regulator of epithelial cell proliferation involved in wound healing; gene expression; interferon-α secretion; and proteolysis. |
| 2.40 (0.1277) | Eukaryotic translation initiation factor 2 subunit 3 | Eif2s3x | P34960 (IF2G_MOUSE) | https://... | Early stages of protein synthesis; formation of translational preinitiation complex. |
| 2.37 (0.1577) | Lipoprotein lipase | Lpl | P11152 (LIPL_MOUSE) | https://... | Enzyme on lumen surface of vascular endothelium involved in triglyceride metabolism; plays key role in the clearance, utilization, and storage of lipids; positive regulation of macrophage-derived foam cell differentiation. |
| 2.20 (0.0978) | Rag-related GTP-binding protein C | Ragc | Q99K70 (RRAGC_MOUSE) | https://... | Binds GDP to form protein heterodimer complex that relocates mTORC1 to lysosome, a critical step in activating TOR signaling cascade. |
| 2.07 (0.1009) | 55 kDa erythrocyte membrane protein | Mpp1 | P70290 (EM55_MOUSE) | https://... | Negative regulation of interleukin-1, apoptosis, cell migration, and membrane potential involved in neutrophil chemotaxis. |
| 1.85 (0.0983) | Interleukin-1 receptor antagonist protein | Il1rn | P25085 (IL1RA_MOUSE) | https://... | Regulates neutrophil chemotaxis by regulating autophagic polarity. |
| 1.83 (0.1046) | FK506-binding protein 15 | Fkbp15 | Q6P9Q6 (FKB15_MOUSE) | https://... | Phagocytosis; lipid catabolism. |
| 1.80 (0.1046) | Phosphodiesterase D4 | Pde4d | P54748 (PDE4D_MOUSE) | https://... | Proteasome regulatory particle assembly, which is part of cellular component biogenesis. |
| 1.70 (0.1347) | 26S proteasome non-ATPase regulatory subunit 5 | Psmd5 | Q8BJY1 (PSMD5_MOUSE) | https://... | Proteasome regulatory particle assembly, which is part of cellular component biogenesis. |
| Downregulated | | | | | |
| -1.80 (0.1385) | Calsequestrin-2 | Casq2 | O09161 (CASQ2_MOUSE) | https://... | Calcium-binding protein plays important role in initiating muscle contraction. |
| -1.80 (0.0598) | 60S ribosomal protein L39 | Rpl39 | P62892 (RL39_MOUSE) | https://... | Liver metabolism; protein; antibacterial humoral response; cytoplasmic translation. |
| -1.73 (0.1092) | Gelsolin | Gsn | Q3SX14 (GELS_BOVIN) | https://... | Actin filament severing, actin nucleation, barbed-end actin filament capping. |

FIG. 16

| Article ID | Material | Pore Size (μm) | Pore Spacing (μm) | Porosity |
|---|---|---|---|---|
| TA1 | PCL-ACPCL | 437 ± 45 | 181 ± 15 | 45% |
| TA2 | PCL-ACPCL | 530 ± 28 | 221 ± 21 | 45% |
| TA3 | PCL-ACPCL | 542 ± 45 | 360 ± 24 | 33% |
| TA4 | PCL-ACPCL | 567 ± 67 | 534 ± 17 | 24% |
| TA5 | PCL-ACPCL | 581 ± 60 | 739 ± 43 | 18% |
| TA6 | PCL-ACPCL | 0 | 0 | 0% |
| CA1 | ePTFE | ~10 – 30 | N/A | N/A |
| CA2 | Nitinol | N/A | N/A | N/A |
| CA3 | Decellularized porcine intestinal submucosa | N/A | N/A | N/A |
| CA4 | Poly-4-hydroxybutyrate | | | |
| CA5 | Polyetheylene terephthalate (Dacron) | 2.1 mm x 3.0 mm (hexagonal shape) | N/A | N/A |
| CA6 | ePTFE and polyglycolic acid / trimethylene carbonate | N/A | N/A | N/A |
| TA7 | PCL-ACPCL | 777 ± 91 | 225 ± 21 | 55% |
| TA8 | PCL-ACPCL | 815 ± 67 | 326 ± 18 | 46% |
| TA14 | PCL-ACPCL | 777 ± 72 | 328 ± 45 | 45% |
| TA9 | PCL-ACPCL | 836 ± 78 | 420 ± 23 | 40% |
| TA10 | PCL-ACPCL | 531 ± 76 | 339 ± 38 | 34% |
| TA11 | PCL-ACPCL | 680 ± 109 | 310 ± 18 | 43% |
| TA12 | PCL-ACPCL | 987 ± 61 | 282 ± 29 | 55% |
| TA13 | PCL-ACPCL | 1096 ± 126 | 363 ± 22 | 51% |

FIG. 17

| Group | TA1 | TA2 | TA3 | TA4 | TA5 | TA6 | CA1 | CA2 | CA3 | CA4 | CA5 | CA6 | TA7 | TA8 | TA9 | TA10 | TA11 | TA12 | TA13 | TA14 |
|---|---|---|---|---|---|---|---|---|---|---|---|---|---|---|---|---|---|---|---|---|
| Infiltrative Neovascularization | 1 | 2 | 2.6 | 1.6 | 1.7 | 1.3 | 1.0 | 3.0 | 3.0 | 3.0 | 3.0 | 3.0 | 3.2 | 2.7 | 3.0 | 3.0 | 3.2 | 3.1 | 3.4 | 2.8 |
| Infiltrative Fibrogenesis | 2.1 | 2.3 | 2.7 | 3.3 | 3.3 | 3.7 | 4.0 | 1.0 | 1.0 | 1.0 | 1.0 | 1.0 | 2.2 | 2.7 | 2.5 | 2.0 | 2.4 | 2.0 | 1.5 | 2.6 |
| Cellular Cuffing | 2.8 | 2.9 | 3.0 | 3.0 | 3.0 | 3.0 | 2.4 | 2.7 | 1.3 | 2.5 | 2.5 | 3 | 2.9 | 2.9 | 2.9 | 2.9 | 2.9 | 2.9 | 2.9 | 2.8 |
| Cumulative Score | 5.9 | 7.2 | 8.4 | 7.9 | 8.0 | 8.0 | 7.4 | 6.7 | 5.3 | 6.5 | 6.5 | 7.0 | 8.3 | 8.3 | 8.4 | 7.9 | 8.5 | 8.0 | 7.8 | 8.2 |

FIG. 18

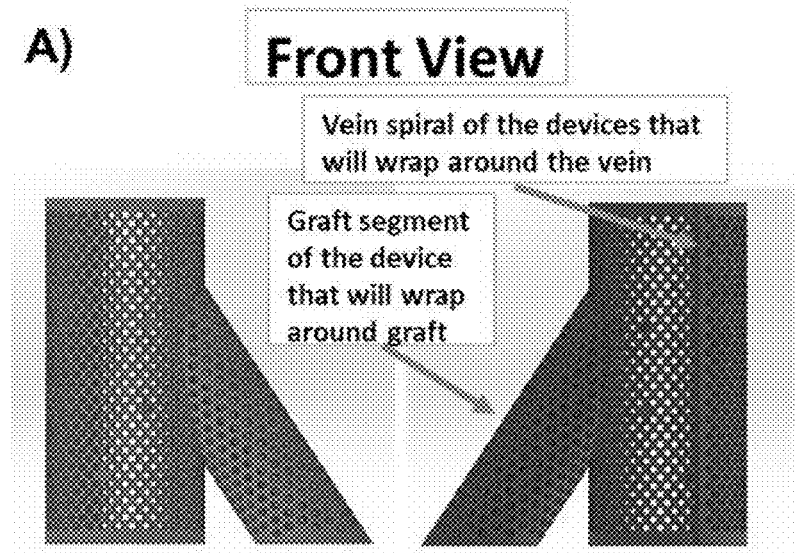
FIG. 21A
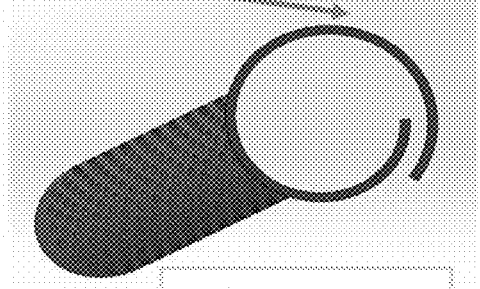
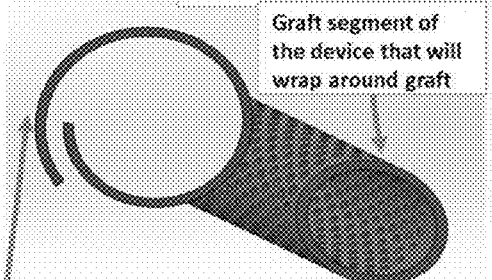
FIG. 21B

POLYMERIC VASCULAR GRAFTS WHICH INDUCE NEOVASCULARIZATION WITH MILD TO MINIMAL INFLAMMATION AND PROMOTION OF FIBROVASCULAR TISSUE

CROSS-REFERENCES TO RELATED APPLICATIONS

This application is a continuation-in-part of U.S. patent application Ser. No. 16/824,674 filed Mar. 19, 2020, which claims the benefit priority to U.S. Provisional Application No. 62/820,785, filed on Mar. 19, 2019, the contents of which are hereby incorporated by reference in their entirety.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to shape memory polymer devices. More particularly, this invention pertains to microporous shape memory polymer implants that can help induce neovascularization and tissue ingrowth, which may be important in mitigating neointimal hyperplasia when applied periadventitially around veins.

Arteriovenous fistulas (AVFs) and arteriovenous grafts (AVGs) are the two preferred modes of vascular access in hemodialysis, as they are far less prone to bacteremia, sepsis, thrombosis, and central venous stenosis than are centralized venous catheters (CVCs). However, recent reports have found that approximately 30-40% of arteriovenous fistulas (AVF) fail to mature, and approximately 30% of those that do mature fail within the first year. Likewise, approximately 19% of AVGs undergo primary failure, with primary and secondary patency rates of just 30-50% and 55-70% at one year, respectively. In coronary artery bypass grafting (CABG), 10-20% of SVGs fail within the first year, and up to 50% within 10 years. Similarly, in the lower extremities of peripheral artery bypass grafts (PABGs), 30-50% fail within 5 years. Failures in AVFs and AVGs contribute to 5-year hemodialysis survival rates of just 42.0%, 30-day ESRD readmissions of 34.2%, and a substantial portion of the estimated costs absorbed by the Centers for Medicare and Medicaid Services (CMS) to treat hemodialysis access dysfunction.

The primary culprit of these failures is venous stenosis caused by neointimal hyperplasia (NH), as well as lack of positive remodeling in AVF maturation failure. Surgical trauma, an order of magnitude increase in pressure and flow, and other factors cause vascular smooth muscle cells (VSMCs) and myofibroblasts within the vein walls to migrate towards the intima and deposit extracellular matrix proteins to form a "neointima"; this neointima obstructs blood flow through the access site and requires further interventions or surgeries.

Systemic therapeutics to improve hemodialysis or vein graft patency have so far exhibited little to marginal benefit, putting the emphasis on therapeutic and/or device approaches that are localized to the access creation site, especially at, and proximal to, the venous anastomosis where the majority of AVF and AVG stenotic lesions typically occur. Perivascular approaches to improve maturation and patency of AVFs, AVGs, and vein bypass grafts for PABG and CABG have to date focused primarily on either promoting processes that are involved in outward remodeling (e.g. adventitial angiogenesis or elastin fragmentation) or attenuating vein wall tension and stresses with mechanical support.

Neointimal hyperplasia at the arteriovenous or graft-vein anastomosis is the main source of failure. Several studies have demonstrated the promise of external stents to reduce NH via promotion of neovascularization in the adventitia as well as through mechanical support. But, limited clinical success of these approaches so far may be attributed in part to inappropriate material selection (e.g. nondegradable, too stiff) and geometric design (e.g. pore size and spacing, diameter, length).

There remains a need for compositions and methods for treating vascular conditions that are relatively noninvasive, painless, and inexpensive. There also remains a need for such compositions and methods which provide better clinical success and decrease failure rates by altering neovascularization, inflammation, and fibrogenesis compared to untreated conditions.

BRIEF SUMMARY

The present disclosure, in one or more embodiments, is drawn to an implantable tissue supporting device that may include a biodegradable polymeric scaffold capable of surrounding a tissue. The biodegradable polymeric scaffold may include at least one polymer. The at least one polymer may include at least one monomer that is crosslinkable. The biodegradable polymeric scaffold may be configured to have a melting temperature and be moldable from a first shape to a second shape by an external force when the melting temperature is met or exceeded. In some embodiments, the device may be mechanically compliant at from about 20° C. to about 50° C., and wherein the biodegradable polymeric scaffold has a pore size of about 400 µm-1200 µm and a pore spacing of about 100 µm to about 750 µm.

In some embodiments, the scaffold may have a pore size of about 600-700 µm, and a pore spacing of about 230 µm. In some embodiments, the scaffold may have a pore size of about 500-600 µm, and a pore spacing of about 300-400 µm. In other embodiments, the scaffold may have a pore size of about 500-1100 µm and a pore spacing of about 200-500 µm. In certain embodiments, the pore size may be about 600-700 µm and a pore spacing of about 300-400 µm, more preferably about 650-700 µm pore size and 300-350 µm spacing, and more preferably about 680 µm pore size and 310 µm spacing.

In some embodiments, the pore size may be about 800-900 µm and a pore spacing of about 400-500 µm, more preferably about 800-850 µm pore size and 400-450 µm spacing, and more preferably about 836 µm pore size and 420 µm spacing.

In some embodiments, the pore size may be about 500-600 µm and a pore spacing of about 300-400 µm, more preferably about 500-550 µm pore size and 350-400 µm spacing, and more preferably about 542 µm pore size and 360 µm spacing.

In certain embodiments, the pore size may be about 700-800 µm and a pore spacing of about 200-300 µm, more preferably about 750-800 µm pore size and 200-250 µm spacing, and more preferably about 778 µm pore size and 225 µm spacing.

In some embodiments, the pore size may be about 800-900 μm and a pore spacing of about 300-400 μm, more preferably about 800-850 μm pore size and 300-350 μm spacing, and more preferably about 815 μm pore size and 326 μm spacing.

In further embodiments, the pore size may be about 700-800 μm and a pore spacing of about 300-400 μm, more preferably about 750-800 μm pore size and 300-350 μm spacing, and more preferably about 777 μm pore size and 328 μm spacing.

In particular embodiments, the pore size may be about 900-1000 μm and a pore spacing of about 600-700 μm, more preferably about 900-950 μm pore size and about 600-650 μm pore spacing, and more preferably about 913 μm pore size and about 632 μm pore spacing.

In some embodiments, the at least one monomer may be allyl functionalized and may include an allyl carboxylate group.

In some embodiments, the at least one monomer may include ε-caprolactone.

In some embodiments, the biodegradable polymeric scaffold may include a plurality of crosslinked polymers, the plurality of crosslinked polymers includes a poly(ε-caprolactone)-co-(α-allyl carboxylate ε-caprolactone) polymer. In some embodiments, the plurality of crosslinked polymers may include about 1 mol % to about 30 mol % of poly(ε-caprolactone).

In some embodiments, the device may have 50-100% shape fixity, and 50-100% shape recovery.

In some embodiments, the device is configured to include a Young's modulus at 37° C. of about 0.05-200 MPa.

In some embodiments, the tissue may be a vein or artery. In some embodiments, the device may be external to the vein or artery.

In some embodiments, the device may be configured such that it retains a shape to fit around said tissue when implanted. In some embodiments, the device may be external to a vascular graft anastomosis.

In some embodiments, the device may form a seamless and sutureless sheath.

In some embodiments, the device may include resilient radial expression in a manner that mimics the compliance properties of said tissue.

In some embodiments, the device may be deformable by at least one of stretching or bending along its length to conform to the shape of the tissue.

In some embodiments, the biodegradable polymeric scaffold may further include a shape memory polymer. In some embodiments, the shape memory polymer may have a melting temperature at or near body temperature.

In some embodiments, the biodegradable polymeric scaffold may include at least one monomer that is photocrosslinkable and further may include at least a second monomer that is not photocrosslinkable.

In some embodiments, the biodegradable polymeric scaffold may include at least one monomer that is allyl-functionalized and further may include at least one second monomer that is not allyl-functionalized.

In some embodiments, the biodegradable polymeric scaffold may be maintained at least 3 months after implantation.

BRIEF DESCRIPTION OF THE SEVERAL VIEWS OF THE DRAWINGS

FIG. 4 is a table of the histological scoring criterion.

FIG. 8 is a table with pore parameter characterizations for a porous scaffold embodiment of the present disclosure.

FIG. 10 is a statistical summary of pore parameter comparisons for a porous scaffold embodiment of the present disclosure.

FIG. 14 is a summary of observations from MMP IHC staining.

FIG. 15 is a pairwise comparison of MMP values from MMP IHC staining.

FIG. 16 is a summary of a proteomics analysis of embodiments of the present disclosure.

FIG. 17 is a table identifying various pore sizes, pore spacings, and porosities of test materials used in the analysis of one or more embodiments of this disclosure.

FIG. 18 is a table identifying the scores of the test materials of FIG. 17 for neovascularization, fibrogenesis, cellular cuffing, and cumulative score.

FIG. 21A is a front view of an embodiment of a microporous shape memory polymer implant.

FIG. 21B is a top view and bottom view of the embodiment of FIG. 21A

DETAILED DESCRIPTION

Figure 1:
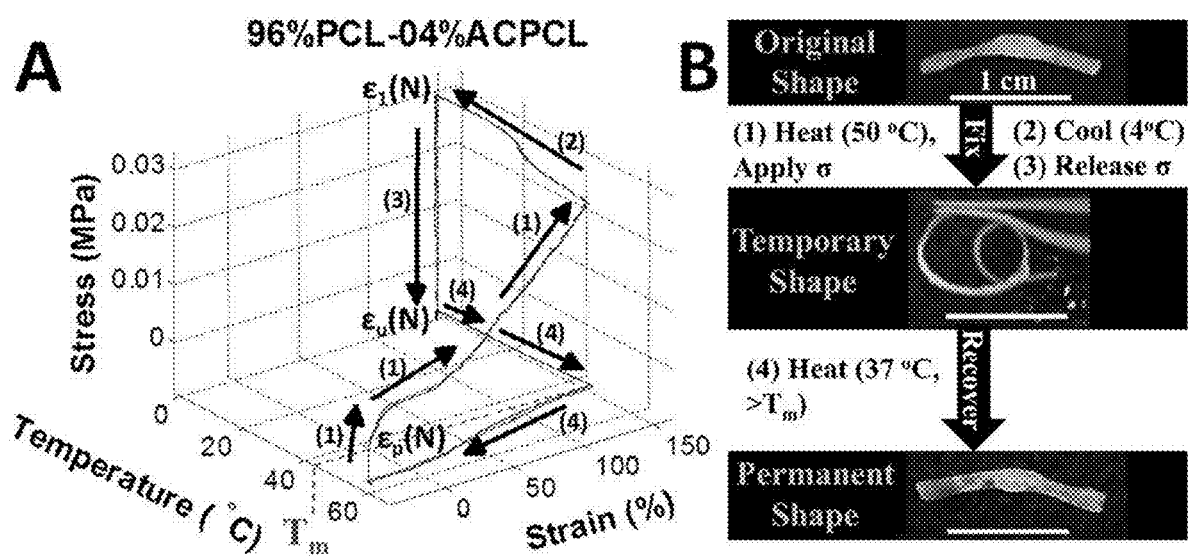
FIG. 1 demonstrates properties of one embodiment of a PCL-ACPCL polymer as disclosed herein.

The details of one or more embodiments of the presently disclosed subject matter are set forth in this document. The description and examples illustrate some exemplary embodiments of the disclosed invention in detail. Those of skill in the art will recognize that there are numerous variations and modifications of this invention that are encompassed by its scope. Accordingly, the description of a certain exemplary embodiment should not be deemed to limit the scope of the present invention.

The presently disclosed subject matter includes compounds and methods for treating vascular conditions. Vascular conditions can often lead to severe complications or even death. Such vascular conditions include but are not limited to, hemorrhages, aneurysms, occlusions, and ischemic tissue. Vascular conditions also present unique treatment challenges. This may be particularly so when treating vessels that are small or difficult to access. For instance, traditional surgical treatment techniques may be invasive to surrounding tissue and may be prohibitively costly, can result in a high amount of pain, and can require a lengthy recovery.

In this regard, thermo-responsive shape memory polymers (SMPs) have drawn extensive interest in a wide range of applications, including biomedical, aerospace, self-healing, and textile applications. Such SMPs may recover their original shape after being programmed into a distinct temporary shape.

One embodiment of the present invention may include a mechanically compliant, moldable, porous, shape memory external support that may be custom fit around a vascular graft anastomosis to prevent neointimal formation. This embodiment may also provide localized, sustained delivery of therapeutics with anti-neointimal effects. In some embodiments, the presently disclosed compounds may include allyl-functionalized SMPs that can be crosslinked via pendant allyl groups. In some embodiments, the presently disclosed materials may be comprised of SMPs, and in certain embodiments may include thermo-responsive SMPs that actuate at or near physiological temperature (e.g., about 37° C.). The present materials may be advantageous over the prior art because they can be relatively high in elastic recovery, easy to manufacture and program, low cost, compatible with vasculature, tunable, and/or biodegradable. Thus, embodiments of the present materials that possess some or all of these features may be advantageous for manufacturing simple and minimally invasive implantable devices for various biomedical applications. Additionally, other physical components, such as described further herein, may also provide advantageous characteristics to the implantable devices of this disclosure.

One embodiment of the present disclosure may include an implantable tissue supporting device. In some embodiments, the implantable tissue supporting device may be disposed around a venous anastomosis to prevent neointimal formation and associated AVG failure via promotion of outward remodeling, instead of inward remodeling. In some embodiments, the implantable tissue supporting device may provide localized, sustained delivery of therapeutics. It will be understood that the term "external support" covers a variety of devices, including an implantable tissue supporting device, among others.

One embodiment of the present disclosure may be an external support or an implantable tissue supporting device, in the form of a porous biodegradable polymeric scaffold that surrounds a tissue. In some embodiments, the polymeric scaffold may include at least one polymer, wherein the polymer may further include at least one monomer that is crosslinkable. In some embodiments, the polymer may include at least one shape memory polymer. In some embodiments, the polymer may include both at least one monomer that is crosslinkable and at least one shape memory polymer. In some embodiments, the support device may be capable of transforming between an original shape and an implanted shape; and wherein the device may be mechanically compliant at from about 20° C. to about 50° C. In some embodiments, the polymeric scaffold may be porous and have a pore size and pore spacing that induces favorable cellular responses.

In some embodiments, the polymeric scaffold of an external support may include a polymer having at least a first monomer and at least a second monomer. The first monomer may be allyl functionalized and may include an allyl carboxylate group. Additionally, the first monomer, the second monomer, or both may be an ester. In other embodiments, the first monomer, the second monomer, or both include ε-caprolactone (CL). In some embodiments, the polymeric scaffold may include a plurality of crosslinked polymers. The plurality of crosslinked polymers may include a poly (ε-caprolactone)-co-(α-allyl carboxylate ε-caprolactone) polymer (PCL-ACPCL). In some embodiments, the plurality of crosslinked polymers may include a first monomer including PCL and a second monomer of ACPCL. In some embodiments, the first monomer may be ACPCL and the second monomer may be PCL. In some embodiments, the plurality of crosslinked polymers may include about 1 mol % to about 30 mol % of the first monomer. In other embodiments, the plurality of crosslinked polymers may include a shape transition temperature from about 20° C. to about 50° C.

The ratio of the first monomer to the second monomer may vary depending on the embodiment and the melting temperature that is preferred. In some embodiments the compound is comprised of about 1 mol %, 5 mol %, 10 mol %, 15 mol %, 20 mol %, 25 mol %, 30 mol %, 35 mol %, 40 mol %, 45 mol %, or 50 mol % of the first monomer. In other embodiments the compound is comprised of about 1 mol % to about 50 mol % of the first monomer, about 1 mol % to about 30 mol % of the first monomer, or about 1 mol % to about 15 mol % of the first monomer. In such embodiments the remainder of the polymer may be comprised of the second monomer.

In some embodiments, the first monomer, the second monomer, or both include an ester. The term "ester" as used herein is represented by a formula $R_1OC(O)R_2$ or $R_1C(O)OR_2$, wherein $R_1$ and $R_2$ can be independently selected from, but are not limited to, an optionally substituted alkyl, alkenyl, alkynyl, or the like. The term ester is inclusive of "polyester," or compounds comprising two or more ester groups.

In some embodiments the first monomer that is allyl functionalized includes an allyl carboxylate group. In such embodiments, the monomer may include a carboxylate group that is then functionalized with an allyl group, or the monomer may be functionalized with the carboxylate allyl group.

In some embodiments the first monomer, the second monomer, or both may include ε-caprolactone (CL) and/or derivatives thereof. For instance, the first monomer including ε-caprolactone can include an α-allyl carboxylate ε-caprolactone (ACCL) monomer. In some embodiments the compounds are based on polycaprolactone (PCL) because PCL has desirable properties for vascular applications, including biocompatibility, suitable rates of biodegradability, and mechanical compliance. Thus the first monomer may include ACPCL. Similarly, the first monomer may include poly(ε-caprolactone) (PCL) alone.

Some embodiments of the compound may include a block copolymer. A "block copolymer" refers to a structure comprising one or more sub-combination of constitutional or monomeric units. In some embodiments, constitutional units are derived via additional processes from one or more polymerizable monomers. There is no limitation on the number of blocks, and in each block the constitutional units may be disposed in a purely random, an alternating random, a regular alternating, a regular block, or a random block configuration unless expressly stated to be otherwise.

As mentioned above, the present compounds can include allyl functionalized monomers that are crosslinkable. The terms "crosslinkable," "crosslink," and the like are used here to refer to an attachment of one portion of a polymer chain to a portion of the same polymer chain or a portion of another polymer chain by chemical bonds that join certain atom(s) of the polymer chain(s). Exemplary chemical bonds that can form crosslinks include covalent bonds and hydrogen bonds as well as hydrophobic, hydrophilic, ionic, or electrostatic interactions. In some instances, covalently crosslinked SMP materials may exhibit superior shape memory properties and thermal stability when compared to SMP materials crosslinked by non-covalent bonds.

Cross-linking may be effected naturally or artificially. For instance, in some embodiments, the first monomer may be photocrosslinkable, where the term "photocrosslink" and the like may be understood and used herein to refer to crosslinks that are formed upon being exposed to electromagnetic radiation, such as visible light and/or ultraviolet radiation. In some embodiments, photocrosslinks can be formed by exposure to ultraviolet light having a wavelength of about 100 nm to about 300 nm. The terms "crosslink" and the like as used herein can be inclusive of the terms "photocrosslink" and the like.

In some embodiments, the allyl-functionalized monomer includes a pendant allyl-including group (e.g. carboxylate allyl group) that can crosslink. In some embodiments the allyl-including group may photocrosslink to another allyl-including group of the same compound or another compound.

In some embodiments the present compounds are biocompatible. Certain embodiments of the present compounds and external supports may be more biocompatible with endothelial cells (ECs) than 100% PCL, as indicated by higher levels of long-term cell viability and healthy cell morphologies. The term "biocompatible" as used herein may be understood to describe a characteristic of substances that do not typically induce undesirable or adverse side effects when administered in vivo. For example, biocompatible substances may not induce side effects such as significant inflammation and/or acute rejection. It should be understood by one of skill in the art that "biocompatibility" is a relative term, and some side effects can be expected even for some substances that are biocompatible. In some embodiments, a biocompatible substance may not induce irreversible side effects, and in some embodiments a substance may be biocompatible if it does not induce long term side effects. One test to determine the biocompatibility of a substance is to measure whether cells die upon being exposed to a material in vitro. For instance, a biocompatible compound or material may cause less than about 30%, 20%, 10%, or 5% cell death.

Additionally, or alternatively, some embodiments of the present compounds may be biodegradable. The term "biodegradable" as used herein may be understood to describe a characteristic of substances that may degrade under physiological conditions to form a product that may be metabolized or excreted without damage to the subject. In certain embodiments, the product may be metabolized or excreted without permanent damage to the subject. Biodegradable substances may also include substances that may be broken down within cells. Degradation may occur by hydrolysis, oxidation, enzymatic processes, phagocytosis, other processes, and combinations thereof. Degradation rates for substances can vary, and may be on the order of hours, days, weeks, months, or years, depending on the material composition and its chemical and physical properties.

The presently disclosed subject matter also includes shape memory polymer materials comprised of any of the presently disclosed compounds. In some instances, the materials may be utilized to form external support devices, such as an implantable tissue support device for deployment around a tissue. In some embodiments, the tissue may be a vein or artery. In some embodiments, the external device may be deployed external to the tissue. In some embodiments, the tissue may be a vascular graft anastomosis, and the device may be deployed external to the anastomosis. Exemplary external supports may include a plurality of crosslinked polymers, the polymers including a first monomer that is allyl functionalized and crosslinkable and a second monomer that not crosslinkable, and the external support may be capable of transforming between a temporary shape and an original shape.

The term "implanted shape" as used herein may be understood to refer to a shape that has been given to a material by exerting a force on the material and/or exposing the material to certain temperatures (i.e., programming step). While the material may retain its temporary shape for any length of time, the shape may be referred to as being temporary because the shape may exist only when external force is exerted on the material. Furthermore, in some embodiments the materials may lose their temporary shape when exposed to a temperature above a melting temperature of the material.

The term "original shape" may be understood to refer to a shape of the material when the polymers of the material are in their native, pre-implanted, unstrained state. Once a material is in its original shape, a material may generally retain the original shape unless an external force or the like is applied to the material. Some embodiments of materials may revert to and/or retain an original shape when exposed in a physically unstressed state to a temperature above a melting temperature of the material (i.e., recovery step). Crosslinks between the plurality of polymers that comprise the materials, either chemical or physical in nature, may help prevent irreversible, plastic deformation during programming and recovery steps.

There are no particular limitations on what shapes can be assumed by the material in its temporary shape or its original shape. In some embodiments, the temporary shape may be selected from a thread, a sheet, tubular shape, a shape corresponding to a blood vessel, a vascular patch, a vascular bypass graft, a vascular stent, a vascular graft anastomosis, and combinations thereof. Likewise, in some embodiments the original shape may be selected from a thread, a sheet, tubular shape, a shape corresponding to a blood vessel, a vascular patch, a vascular bypass graft, a vascular stent, a vascular graft anastomosis and combinations thereof.

Embodiments of the present materials may be categorized as thermomechanical SMPs, whereby the polymers may exhibit a transition from a temporary shape to an original shape when transitioning above and/or below a melting temperature of the compounds. For instance, a material may initially have an original shape, and a temporary shape can be induced by heating the material above its melting temperature while exerting a force on the material that molds or bends the material into a desired temporary shape. The material may then retain its temporary shape if it is cooled to a temperature below the melting point of the material while holding the material in the temporary shape, and the material may substantially retain this temporary shape so long as it is kept at a temperature below the melting temperature of the material. Subsequently, the material may revert to its original shape by heating the material to a temperature above its melting temperature.

The present compounds and materials may include a wide range of melting temperatures. In some embodiments, the compounds and materials may include a melting temperature of about 20° C. to about 50° C., including melting temperatures of about 20° C., 25° C., 30° C., 35° C., 40° C., 45° C., and 50° C. In some embodiments the compounds and materials may include a melting temperature that is at or substantially near physiological temperature (e.g., about 37° C.) so that the materials may experience a switch-like shape transition when implanted into a subject. The present materials may also include relatively high elastic recovery. In some embodiments, the present materials may include a strain recovery rate (Rr) and/or strain fixity rate (Rf) of 90% or more, and in some embodiments Rr and/or Rf can independently be about 91%, 92%, 93%, 94%, 95%, 96%, 97%, 98%, or 99% or more. The present materials may also possess qualities that make them similar to, and therefore appropriate for, use in conjunction with blood vessels. For instance, some embodiments of materials may include compliant and ductile qualities that may be suitable for use with vasculature. Some embodiments may also include elastic moduli of about 1.0 to about 200.0 MPa at 37° C., which may be suitable for certain vascular applications.

Embodiments of the present disclosure that include a PCL-ACPCL based SMPs may exhibit a physical property of melting at or near body temperature. In one embodiment, a custom-fittable external support may include a porous surface that is slowly-biodegradable. In another embodiment, the PCL-ACPCL SMP may be moldable at or near body temperature. As the SMP melts, transitioning from an elastic to a viscoelastic state, the external support may mold itself to the specific geometry of a venous anastomosis or a vascular graft anastomosis. Due to the porous properties, the external support may promote more uniform outward vein remodeling and may minimize asymmetric wall thickening that may cause turbulent irregular flow and subsequent neointimal hyperplasia. In some embodiments, the external support may also enhance vein surface area coverage, which may lead to better dissipation of heightened wall tensions and stresses in the arteriovenous environment as compared to products of the prior art.

Some embodiments of the present disclosure may include external support devices using materials that are slowly biodegradable in vivo. It will be understood that slowly biodegradable will generally include an external support that will maintain at least a portion of the support in vivo for at least 1 year. In some embodiments, the external support may degrade over a period of 2 years or more. It will also be understood that some embodiments may be biodegradable at a faster rate but should generally maintain a portion of the support structure for at least 3 months. The 3-month time period may allow for the external support to ensure sufficient mechanical support for the critical remodeling period that may generally last 3 months. In other embodiments, the external support device may be biodegradable at approximately 4 months, at approximately 5 months, at approximately 6 months, at approximately 7 months, at approximately 8 months, at approximately 9 months, at approximately 10 months, and/or at approximately 11 months.

In some embodiments, the external support may be completely biodegradable, which may include the support being fully resorbable. Biodegradability may help to mitigate risk of infection, chronic inflammation, and neointimal hyperplasia-induced compliance mismatches.

In some embodiments, different portions of the external support may have different biodegradability properties and/or rates. In one embodiment, one portion of the external support may degrade at a more rapid rate than another portion. In one embodiment, all portions may be biodegradable, but may degrade at different rates which provide different functions for the support. In some embodiments, one portion of the external support may be biodegradable while another portion my be non-biodegradable.

As indicated above, embodiments of the present invention may surround a tissue, such as a vein and/or artery. In some embodiments, the device may be external to the vein or artery. In some preferred embodiments, the device may be external to a vascular graft anastomosis.

Once implanted, embodiments of the present disclosure may form a seamless and sutureless sheath. The sheath may be mesh or netting. Additionally, once implanted, some embodiments may include physical properties that demonstrate resilient radial expression in a manner that mimics the compliance properties of the tissue. The embodiments may be deformable by at least one of stretching or bending along its length to conform to the shape of the tissue.

Figure 2:
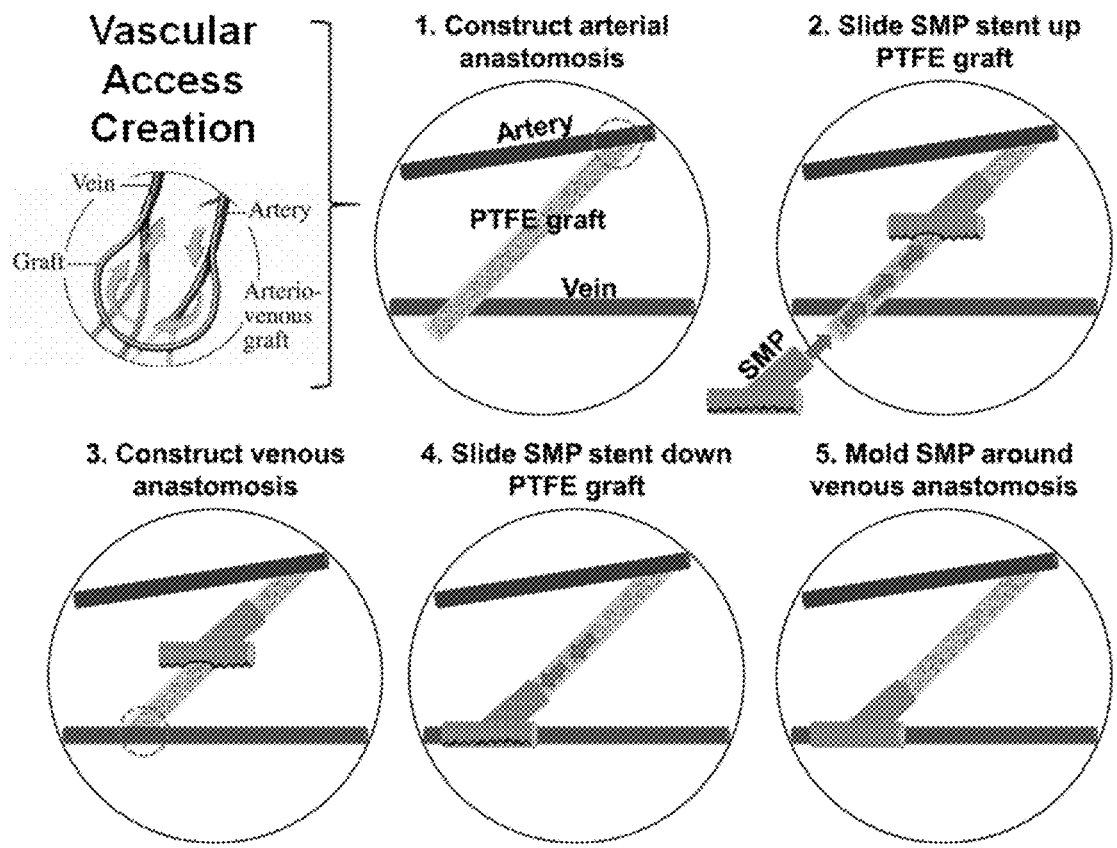
FIG. 2 illustrates a scheme for vascular access creation and molding of an embodiment of the present disclosure.

In some embodiments, the custom-fit of the device at vascular access operating temperatures (e.g., about 28-37° C.) may be possible due to the chemical properties from copolymerizing ε-caprolactone (CL) with α-allyl carboxylate-ε-caprolactone (ACCL). This copolymer may produce a polymer library with Tm's ranging from at least 28-43° C. and may further include exceptional shape memory properties. (FIG. 1). Given the shape memory capabilities around 37° C., the geometry of external supports may be custom tailored during implantation with relative ease to fit the asymmetric distal anastomosis. (FIG. 2).

Figure 3:
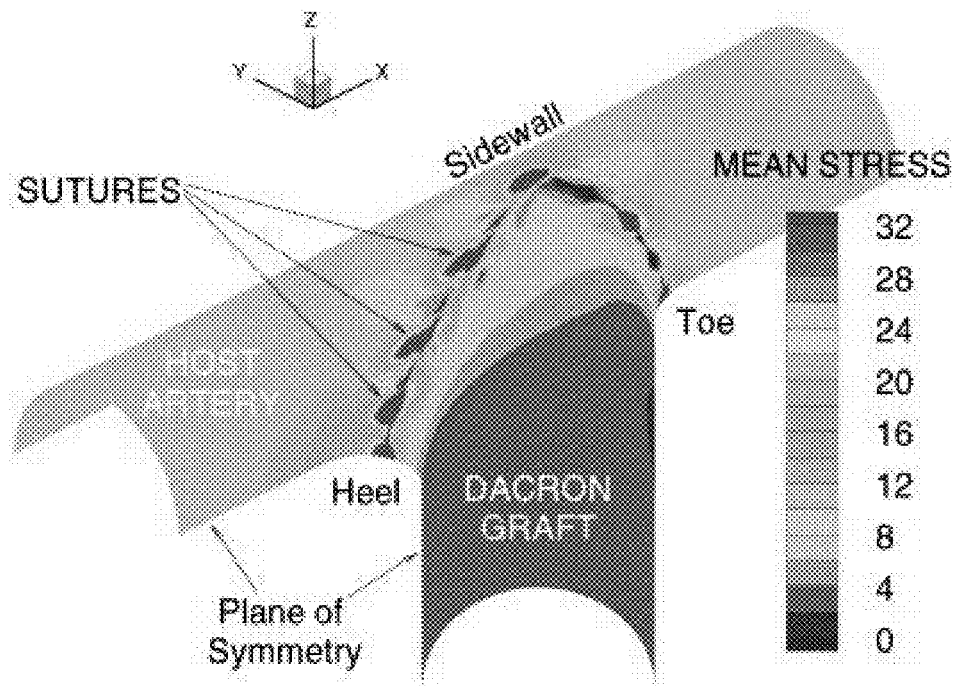
FIG. 3 illustrates an embodiment of the present disclosure and demonstrates mean stress distribution at the end-to-side Dacron graft-artery anastomosis.

Embodiments with this copolymerization chemical makeup may also enable fine-tuning of thermomechanical properties such that SMP external supports may be fabricated with artery-mimetic mechanical properties. Such properties may be important because compliance mismatch between a vein and a synthetic graft or artery is one factor involved in neointimal formation. For example, a 68% decrease in mechanical compliance from a blood vessel to a graft, equivalent to transitioning from an artery to Dacron, may result in a 40% increase in mean anastomotic stress along suture lines and subsequent neointimal formation in an end-to-side geometry. (FIG. 3).

In addition to the chemical properties of the device, the macromolecular properties of the device may also be used to impart important physical characteristics and functions. In particular, embodiments having a porous surface may be useful in fostering adventitial microvessel formation.

In some embodiments, the porous surface may be dictated by certain pore parameters, such as pore size, pore spacing, and overall porosity. These features may influence angiogenic responses induced by polymeric scaffold implantation. The pore parameters of this disclosure may affect the surface area-to-volume ratio and topology and may play a role in the extent and type of inflammatory reactions observed in vivo. Prior art products have had difficulty in incorporating products that are pro-angiogenic, pro-outward remodeling, or anti-inflammatory, immunosuppressant therapeutics to similar devices as disclosed herein. None have recognized the potential for modifying the pore parameters of a porous external support device to influence angiogenic, outward remodeling, neoadventitial growth, and inflammatory reactions in vivo.

Some embodiments of the present disclosure may include an implantable tissue supporting device, in the form of a porous biodegradable polymeric scaffold that surrounds a tissue. In some embodiments, the polymeric scaffold may include at least one polymer, wherein the polymer may further include at least one monomer that is crosslinkable and/or at least one shape memory polymer. In some embodiments, the support device may be capable of transforming between an original shape and an implanted shape; and wherein the device is mechanically compliant at from about 20° C. to about 50° C. In some embodiments, the polymeric scaffold may be porous and have a pore size and pore spacing that induces favorable cellular responses.

Figures 5, 6:
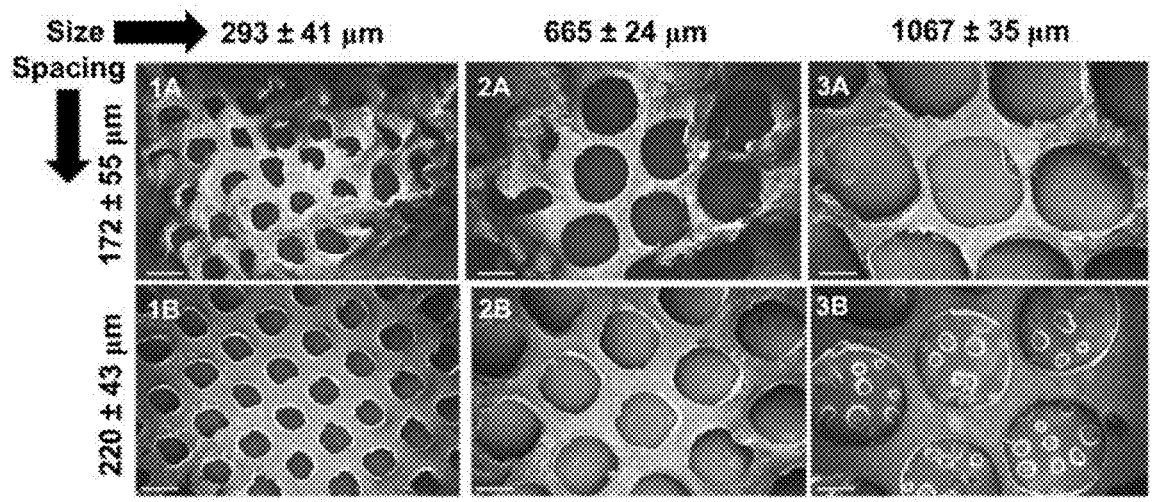
FIG. 5 is a group of SEM micrographs of a porous scaffold embodiment of the present disclosure.
FIG. 6 is a table with pore parameter characterizations for a porous scaffold embodiment of the present disclosure.
Figure 7:
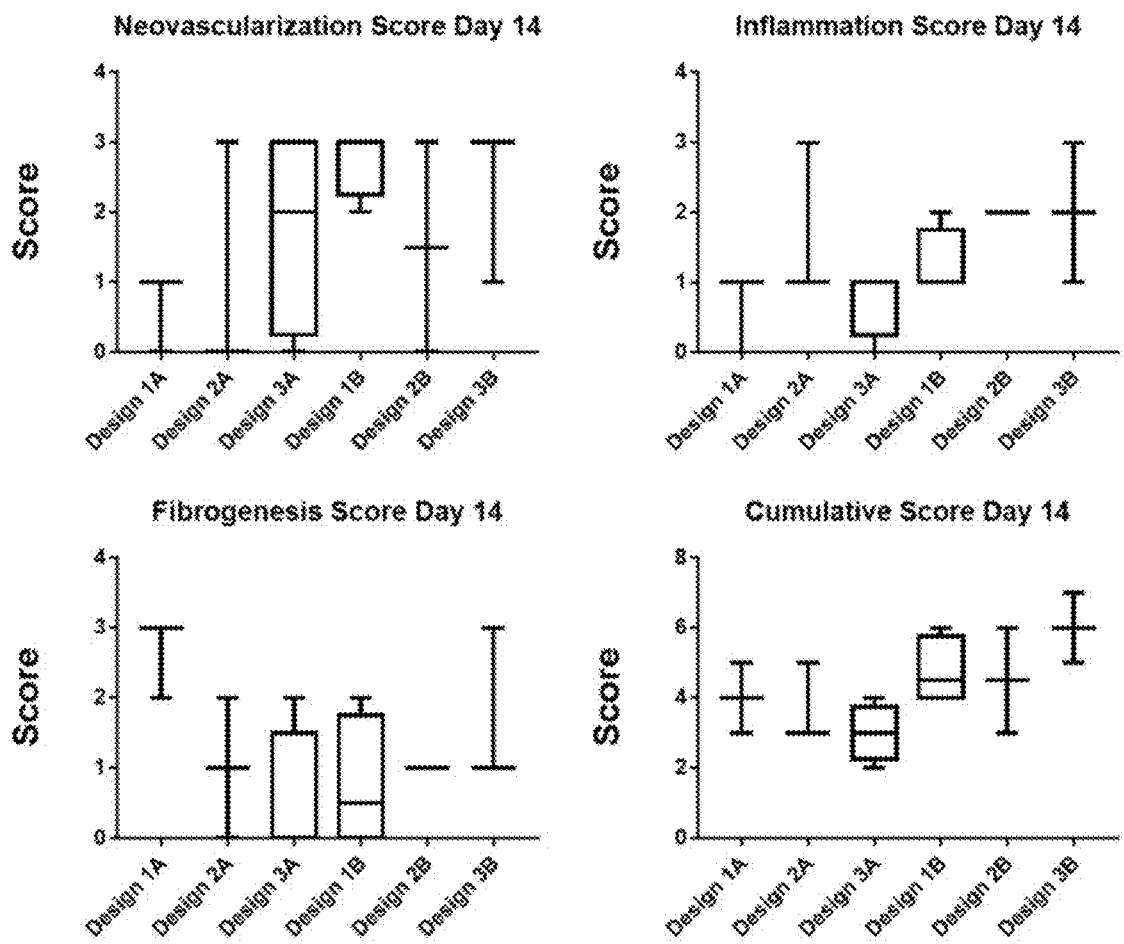
FIG. 7 is a graph of histological scoring results for a porous scaffold embodiment of the present disclosure.
Figure 9:
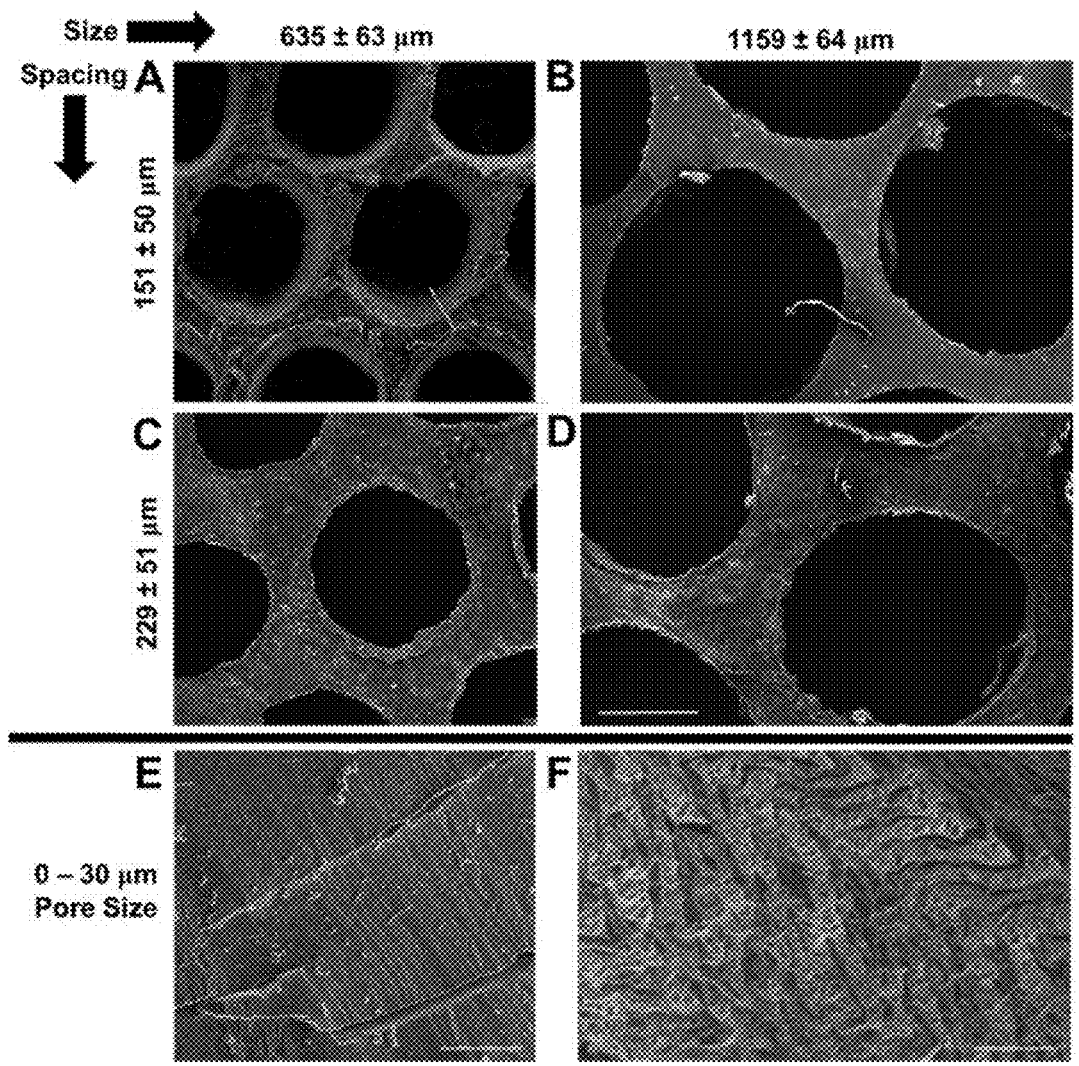
FIG. 9 is a group of SEM micrographs of a porous scaffold embodiment of the present disclosure in comparison to non-porous polymers and microporous polymers.

In some embodiments, the porous biodegradable polymer scaffold may include a porous surface with pore spacing of 100 to 750 microns. In some embodiments, the pores may be spaced apart from 200 to 300 microns. In some embodiments, the pores may be spaced from 220 to 250 microns. In some embodiments, the pores may be spaced approximately 220 microns apart. (FIG. 5). In some embodiments, the pores may be spaced approximately 230 microns apart. (FIG. 9).

In certain embodiments, the pores may be spaced apart from 100 to 750 microns, from 200 to 600 microns, from 300 to 400 microns, and/or about 500 microns. In some embodiments described herein, the pore spacing may be from 100 to 200 microns, from 200 to 300 microns, from 300 to 400 microns, from 400 to 500 microns, from 500 to 600 microns, from 600 to 700 microns, and/or from 700 to 750 microns.

Embodiments including porous external support devices may elicit a more favorable tissue response by altering neovascularization, inflammation, and fibrosis in comparison to microporous structures and closer-spaced pores in general.

In some embodiments, the porous biodegradable polymer scaffold may include a porous surface with pore sizes between 400 microns and 1200 microns. In some embodiments, the pore size may be between 600 and 700 microns. In some embodiments, the pore size may be about 630 microns, 635 microns, 640 microns, 645 microns, 650 microns, 655 microns, 660 microns, 665 microns, 670 microns, or 675 microns.

In certain embodiments, the pore size of the external support device may be about 600-700 µm and a pore spacing of about 300-400 µm, more preferably about 650-700 µm pore size and 300-350 µm spacing, and more preferably about 680 µm pore size and 310 µm spacing. In some embodiments, the pore size may be about 800-900 µm and a pore spacing of about 400-500 µm, more preferably about 800-850 µm pore size and 400-450 µm spacing, and more preferably about 836 µm pore size and 420 µm spacing. In certain embodiments, the pore size may be about 700-800 µm and a pore spacing of about 200-300 µm, more preferably about 750-800 µm pore size and 200-250 µm spacing, and more preferably about 777 µm pore size and 225 µm spacing. In some embodiments, the pore size may be about 800-900 µm and a pore spacing of about 300-400 µm, more preferably about 800-850 µm pore size and 300-350 µm spacing, and more preferably about 815 µm pore size and 326 µm spacing. In further embodiments, the pore size may be about 700-800 µm and a pore spacing of about 300-400 µm, more preferably about 750-800 µm pore size and 300-350 µm spacing, and more preferably about 777 µm pore size and 328 µm spacing. In yet other embodiments, the pore size may be about 500-600 µm and a pore spacing of about 300-400 µm, more preferably about 500-550 µm pore size and 300-350 µm spacing, and more preferably about 531 µm pore size and 339 µm spacing. In some embodiments, the pore size may be about 900-1000 µm and a pore spacing of about 200-300 µm, more preferably about 950-1000 µm pore size and 250-300 µm spacing, and more preferably about 987 µm pore size and 282 µm spacing. In certain embodiments, the pore size may be about 1000-1150 µm and a pore spacing of about 300-400 µm, more preferably about 1050-1150 µm pore size and 300-350 µm spacing, and more preferably about 1096 µm pore size and 363 µm spacing. In particular embodiments, the pore size may be about 900-1000 µm and a pore spacing of about 600-700 µm, more preferably about 900-950 µm pore size and about 600-650 µm pore spacing, and more preferably about 913 µm pore size and about 632 µm pore spacing.

In yet other embodiments, the pore size of certain external support devices may be about 400-500 microns and have a pore spacing of about 100-200 microns, more preferably having a pore size of about 400-450 µm and a pore spacing of about 150-200 microns, and more preferably a pore size of about 437 microns and a pore spacing of about 181 microns. In some embodiments, the pore size of certain external support devices may be about 500-600 microns and have a pore spacing of about 200-300 microns, more preferably having a pore size of about 500-550 µm and a pore spacing of about 200-250 microns, and more preferably a pore size of about 530 microns and a pore spacing of about 221 microns. In some embodiments, the pore size of certain external support devices may be about 500-600 microns and have a pore spacing of about 300-400 microns, more preferably having a pore size of about 500-550 µm and a pore spacing of about 350-400 microns, and more preferably a pore size of about 542 microns and a pore spacing of about 360 microns. In certain embodiments, the pore size of certain external support devices may be about 500-600 microns and have a pore spacing of about 500-600 microns, more preferably having a pore size of about 550-600 µm and a pore spacing of about 500-550 microns, and more preferably a pore size of about 567 microns and a pore spacing of about 534 microns. In yet other embodiments, the pore size of certain external support devices may be about 500-600 microns and have a pore spacing of about 700-800 microns, more preferably having a pore size of about 550-600 µm and a pore spacing of about 700-750 microns, and more preferably a pore size of about 581 microns and a pore spacing of about 739 microns.

It will be appreciated by those skilled in the art that both pore size and pore spacing, and thereby overall porosity, can have varying effects on neovascularization, fibrogenesis, inflammation, and cellular cuffing. The increase or decrease of any one effect can be difficult to determine as no one trend emerges with an increase or decrease in pore size or spacing, or both. Instead, one must study the sizing and spacing of pores together to determine whether advantageous effects can be elucidated. As seen in FIGS. 19A, 19B, 20A, and 20B, even when pore size is held relatively constant and pore spacing is varied (FIGS. 19A and 19B), the effect of neovascularization and fibrogenesis is not predictive. Similarly, when pore spacing is held relatively constant and pore size is varied, (FIGS. 20A and 20B), the effect of neovascularization and fibrogenesis is also not predictive.

Because of the alteration of neovascularization and fibrogenesis, one of skill may choose which to prioritize to generate the best outcome(s) based on the situation. As an example, if one of skill prefers to prioritize increasing neovascularization over decreasing fibrogenesis, one can utilize certain scaffold devices such as those described, but not limited to, as TA7, TA9, TA10, TA11, TA12, TA13, and TA14 in FIGS. 17 and 18. Likewise, if one of skill prefers to prioritize decreasing fibrogenesis over increasing neovascularization, one can utilize certain scaffold devices such as those described, but not limited to, as TA3, TA4, TA5, TA6, and TA8. Additionally, certain embodiments may both increase neovascularization and decrease fibrogenesis to a point where one yields sufficient levels of both so that a balanced approach generates the greatest clinical outcomes versus prioritizing one over the other, such as TA11, TA9, and TA3, generating the highest overall clinical (cumulative) scores shown in FIG. 18. While TA11, TA9, and TA3 are exemplary, they are not the sole embodiments one may choose to yield both increased neovascularization and decreased fibrogenesis, as shown in FIG. 18.

In yet other embodiments, one of skill in the art may prefer to prioritize a polymer scaffold which is more inert than other scaffolds. By inert, it is meant that the pore size and spacing produces less neovascularization and less fibrogenesis than other embodiments. For example, certain embodiments having a pore size of from 500-600 microns and a pore spacing of from 500-800 microns may be more inert than other embodiments. In certain embodiments, the pore size may be from 500-600 microns, or more preferably from 550-600 microns, or may be 581 microns. In other embodiments, the pore size may be from 500-600 microns, or more preferably from 550-600 microns, or may be 567 microns. In certain embodiments, the pore spacing may be from 700-800 microns, more preferably from 700-750 microns, more preferably 739 microns. In certain embodiments, the pore spacing may be from 500-600 microns, more preferably from 500-550 microns, more preferably 534 microns. In certain embodiments, the pore size may be 581 microns and the pore spacing may be 739 microns. In other embodiments, the pore size may be 567 microns and the pore spacing may be 534 microns. An advantage of using a more inert polymer spacing and sizing is that one can decrease the alteration of fibrogenesis and neovascularization upon implantation of the scaffold. It may also be noted that in certain embodiments, a polymer scaffold having inert characteristics may be one that has no porosity. In such embodiments, the surface of the polymer scaffold is continuous with no porosity but still promotes less neovascularization and less fibrogenesis than other embodiments that are porous as described herein.

While certain embodiments of a porous biodegradable polymer scaffold may have a more homogenous pore size and spacing across the surface of the scaffold, one may also combine different pore size and spacing combinations together to generate a scaffold surface that has different portions of the surface with different size and spaced pores. In certain embodiments, the polymer scaffold may have a first region that is proximal to the native vein or artery and a second region which is proximal to the graft. In such an embodiment, the first region of the polymer scaffold proximal the native vein or artery may have a pore spacing that is smaller than the second region. One of skill in the art may appreciate that any combination of disclosed pore sizes and spacings disclosed herein may be used to produce a porous biodegradable polymer scaffold that combines different sizes and/or spacings proximal the native vein or artery and proximal the graft.

While not intended to be limiting, an example of one embodiment of the foregoing biodegradable polymer scaffold having different portions of the scaffold with different porosities includes a scaffold where the portion proximal, or in some embodiments surrounding, the native vessel includes a pore size from about 700-800 microns and a pore spacing from about 300-400 microns, or more preferably from about 750-800 microns pore size and from about 300-350 microns pore spacing, or more preferably from about 777 microns pore size and from about 328 microns pore spacing, and further, where the portion proximal, or in some embodiments surrounding, the graft includes a pore size from about 500-600 microns and a pore spacing from about 500-600 microns, or more preferably from about 550-600 microns pore size and from about 500-550 microns pore spacing, or more preferably from about 567 microns pore size and from about 534 microns pore spacing In certain embodiments, the portion proximal to, or in some embodiments surrounding, the graft includes a pore size from about 600-700 microns and a pore spacing from about 300-400 microns, or more preferably from about 650-700 microns pore size and from about 300-350 microns pore spacing, or more preferably from about 680 microns pore size and from about 310 microns pore spacing.

The presently disclosed subject matter further includes methods for treating a vascular condition. In some embodiments the method may include administering an external support device in a temporary shape to a subject in need thereof, the device comprising a plurality of crosslinked polymers that include a first monomer that is allyl-functionalized and crosslinkable and a second monomer that not crosslinkable. The embodied methods may further comprise a step of allowing the external support device to transform from the temporary shape to an original shape. The transformation from a temporary shape to an original shape may be initiated by heating the device above the melting point of the plurality of polymers, and in some embodiments the heating may be done passively from heat that is emitted from the subject.

The step of administering the external support device may include molding the external support device to a blood vessel of interest, to an artery, to a vein, or to a vascular graft anastomosis. As used herein, the term "mold" and the like refers to the placement and shaping of the external support to a blood vessel and exerting a force to the support such that it forms a sheath around the blood vessel. In some embodiments, molding may refer to wrapping a sheet-like external support completely around a blood vessel.

The terms "treatment" or "treating" as used herein may be understood to refer to the medical management of a subject with the intent to cure, ameliorate, stabilize, or prevent a disease or pathological condition. The term "condition" may be understood to be inclusive of diseases, disorders, and the like. "Treatment" may be understood to include active treatment, that is, treatment directed specifically toward the improvement of a condition, and also includes causal treatment, that is, treatment directed toward removal of the cause of the associated disease, pathological condition, or disorder. In addition, "treatment" may be understood to include palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder.

Furthermore, the terms "subject" or "subject in need thereof" may be understood to refer to a target of administration, which optionally displays symptoms related to a particular disease, pathological condition, disorder, or the like. The "subject" of the herein disclosed methods may be a vertebrate, such as a mammal, a fish, a bird, a reptile, or an amphibian. Thus, the subject of the herein disclosed methods may be a human, non-human primate, horse, pig, rabbit, dog, sheep, goat, cow, cat, guinea pig or rodent. The term does not denote a particular age or sex. Thus, adult and newborn subjects, as well as fetuses, whether male or female, are intended to be covered. A "patient" may be understood to refer to a subject afflicted with a disease or disorder. The term "subject" may include human and veterinary subjects.

In some embodiments, the method may include providing an implantable tissue supporting device in an original shape wherein the implantable tissue supporting device is not implanted in a subject. The device may comprise a biodegradable polymeric scaffold wherein the scaffold may include a plurality of crosslinked polymers that include a first monomer that is allyl-functionalized and crosslinkable and a second monomer that not crosslinkable. The scaffold of the device may be porous and have a pore size of about 600-750 µm and a pore spacing of about 220 µm or more. In some embodiments, the scaffold may include a pore size of about 500-700 µm, and a pore spacing of about 220 to about 250 µm. In some embodiments, the pore size and spacing may be the same as disclosed previously.

Once the implantable tissue supporting device is provided, it may be administered to a subject wherein the device is positioned in the subject causing the polymers of the device to reach and/or surpass the melting temperature. The implantable tissue supporting device may then be manipulated to surround an artery, vein, or venous graft anastomosis. The step of manipulating the device may include molding the device to custom-fit around the specific artery, vein, or venous graft anastomosis of the subject. The implantable tissue supporting device may be retained in its external position until it degrades. In some embodiments, the device may degrade entirely. In some embodiments, a portion of the device may not degrade and may remain as an implant.

The presently disclosed compounds and external supports present several advantages for methods of treating vascular conditions. First, the external supports may include an original or temporary shape that provides for a custom-fit device that avoids neointimal hyperplasia and produces advantageous cellular responses over the prior art. The ability to customize the shape of the device also makes it suitable for unusual vasculature, such as branched arteries, as well as for treating other non-vascular conditions. The ability to customize the shape also permits the present compositions and external support devices to achieve robust and facile surgical placement via minimally invasive techniques.

Once implanted, the present external supports may offer mechanical compliance that withstands blood vessel pulsation similar to an artery. Further still, embodiments of the present disclosure may be biocompatible and, optionally, may exhibit biodegradable characteristics that are sufficiently slow to permit healing of the vasculature. The present embodiments may also have a porosity that promotes microvascular growth to repair damaged vessel tissue. The present compositions, devices, and methods may therefore provide treatments that are easily implemented, cost effective, and less invasive to the subject.

Embodiments of a process for, the polymerization product of, and articles manufactured by additive manufacturing of vinyl-functionalized polymers and/or shape memory polymers are described herein.

As disclosed herein, articles may be manufactured by a process comprising: (i) providing a manufacturing device; (ii) providing a precursor polymer; (iii) exposing the precursor polymer to an intensity and frequency of light to initiate photo-polymerization of the precursor polymer to form a layer of the article; and (iv) repeating step (iii) a number of times to form the article in a layer-by-layer configuration. In some embodiments, the precursor polymer may be provided in a precursor solution. In yet further embodiments, it may be necessary to sterilize the article in which at least one cycle of ethylene oxide sterilization may be conducted. In some embodiments, two or more cycles of ethylene oxide sterilization may be conducted.

To effectively manufacture the articles by the process as described herein, some embodiments of the manufacturing process may further include heating at least a portion of the manufacturing device. The heating may allow for the constituents of the precursor solution to remain in solution and at proper thermal and/or mechanical ranges to allow for formation in a layer configuration. It may be required to pre-heat at least a portion of the manufacturing device before providing the precursor polymer and/or precursor solution. In some embodiments, the manufacturing device may include a platform which may house the precursor solution. The precursor solution may be disposed in a container, such as a glass dish, which may be disposed about the platform. In some embodiments, the platform may be configured to be heated, thereby heating the precursor solution. The manufacturing device and/or platform may be heated to about 20° C. to 80° C., or about 30° C. to 50° C., or about 40° C. to 45° C. In some embodiments, the manufacturing device and/or platform may be heated to 75° C. It will be understood that the precursor solution may be at a lower temperature than the temperature of the device or platform.

In certain embodiments, the manufacturing device may include a heating element disposed between the platform and the solution container wherein the heating element is heated thereby heating the precursor solution. The heating element may include a void configured to allow a light source to transfer light from the light source and onto the precursor polymer to initiate photo-polymerization.

In some embodiments, the manufacturing device may be a 3D printing device. The 3D printing device may include a movable z-platform that moves based on the desired printing of the final product. In some embodiments, the z-platform may be heated, or a heating element may be disposed about the z-platform between the platform and the solution container.

As previously disclosed, the process may include exposing the precursor polymer and/or the precursor solution to an intensity and frequency of light to initiate photo-polymerization of the precursor polymer to form a layer of the article. In some embodiments, the article is manufactured layer by layer, wherein each layer is produced at from 10 µm to 100 µm, more preferably from 25 µm to 75 µm, more preferably from 40 µm to 60 µm, and most preferably about 50 µm. In certain embodiments, the layer is 100 µm. In some embodiments, the layer is 90 µm. In some embodiments, the layer is 80 µm. In some embodiments, the layer is 70 µm. In some embodiments, the layer is 60 µm. In some embodiments, the layer is 50 µm. In some embodiments, the layer is 40 µm. In some embodiments, the layer is 30 µm. In some embodiments, the layer is 30 µm. In some embodiments, the layer is 20 µm. In some embodiments, the layer is 10 µm. In addition to the layer thickness, the pixel resolution of the article may be from 25-75 µm, or more preferably from 35-50 µm, or may be 35 µm, or may be 50 µm.

In certain embodiments, the article may be exposed to light to initiate the photo-polymerization, wherein the exposure time is from 1 second to 60 seconds. In some embodiments, from 10 seconds to 50 seconds. In some embodiments, about 20 seconds to 30 seconds. In some embodiments, the exposure time is 6.5 seconds. In some embodiments, the exposure time is 20 seconds. And yet in further embodiments, one layer may have a different exposure time than another later. For example, a first layer may be exposed for 10 seconds wherein a second layer may be exposed for 20 seconds. In some embodiments, the first three layers may be exposed for 20 seconds while the remaining layers may be exposed for 6.5 seconds.

It may be necessary to undergo post-manufacture processing of the articles. In some embodiments, solvent may be warmed from about 40° C. to about 60° C. The article may be transferred to the warmed solvent and incubated at between about 40° C. to about 60° C. In some embodiments, the incubation may last for at least 6 hours. In some embodiments, the incubation may last at least 8 hours. In some embodiments, the article may be incubated in the solvent overnight. During the time the article remains in the solvent, unreacted solution may leach from the article. In some embodiments, the solvent may be DMSO. Other solvents as appreciated and known by those skilled in the art may be used.

After incubation in the solvent, such as DMSO, the article may be transferred to an ethanol bath at room temperature. In some embodiments, the article may be washed in the ethanol bath from 15 minutes to 60 minutes, more preferably about 30 minutes. In some embodiments, the article may remain in the ethanol bath overnight. In some embodiments, the article may remain in an ethanol bath on the order or days, months, and/or years.

The manufacturing process may include providing a precursor polymer and/or a precursor solution. Generally, as used herein, the precursor polymer may be disposed in the precursor solution. In some embodiments, the precursor solution may include the precursor polymer, solvent, and a photoinitiator. In some embodiments, the precursor solution may further include a crosslinker. In other embodiments, the precursor solution may also include an absorber.

EXAMPLES

The presently disclosed subject matter is further illustrated by the following specific but non-limiting examples. The following examples may include compilations of data that are representative of data gathered at various times during the course of development and experimentation related to the presently disclosed subject matter.

Example 1

This example describes the preparation of SMP films with crosslinked x % PCL-y % ACPCL. The crosslinked x % PCL-y % ACPCL films of uniform thickness (0.2-0.3 mm) were produced from a 10 wt % polymer solution containing 3 wt % 2,2-dimethoxy-2-phenylacetophenone via a thin film applicator (Precision Gage & Tool, Co., Dayton, Ohio) and 365 nm irradiation (4.89 J cm-2, 18.1 mW cm-2) with a Novacure 2100 Spot Curing System (Exfo Photonic Solutions, Inc., Mississauga, Ontario, Canada). After drying, samples were incubated in DCM for 2 days to determine gel content. To induce pores, 8×4 mm spherical pore arrays spaced evenly apart were drawn in CAD designs and cut using a Laser Engraver (KERN Laser Systems, Wadena, Minn.) at a power of 1.5 W, speed of 0.08 in/sec, and frequency of 500 Hz. Films were then thoroughly washed in ethanol.

Example 2

This Example describes exemplary pore parameter characterization and influence on tissue response based on SMP embodiments as prepared in Example 1. SMP scaffolds of different pore sizes and spacing were prepared for implantation. (FIG. 5, FIG. 6). Pore size and spacing were characterized by scanning electron microscopy (SEM). Samples were mounted onto aluminum studs covered by carbon adhesive, coated with gold and palladium, and imaged on a Quanta 250 Environmental SEM (Thermo Fisher Scientific, Waltham, Mass.). Pore diameter and spacing were determined by calculating the mean±SD from individual measurements on ImageJ software (NIH, Bethesda, Md.). Porosity was calculated as the ratio of void area: total area by assuming that pore diameter does not vary as a function of height and assuming that pores are exactly equidistant from one another:

$$\text{Porosity (\%)} = \frac{2\pi\left(\frac{Diameter_{pore}}{2}\right)^2}{\sqrt{3(Diameter_{pore} + Spacing_{pore})^2}}$$

Neovascularization, inflammation, and fibrogenesis were evaluated for each design at 14 days post-implantation by a blinded, board-certified veterinary pathologist at Vanderbilt University based on an established scoring criterion as described in FIG. 4. A cumulative score was calculated for samples of each design by summing the scores for each of the three categories. (FIG. 4—Appx. A) PCL-ACPCL scaffolds with higher pore spacing (~230 microns) elicited more favorable tissue responses of more neovascularization, less inflammation, and less fibrosis in comparison to closer-spaced pores (~150 microns).

Example 3

This Example describes an embodiment of an external support utilized to determine the pore parameter characterization and influence on tissue response. SMP scaffolds of different pore sizes and spacing were prepared for implantation. In this Example, the SMP comprised PCL—ACPCL which were paired for pore size and spacing. In addition, a microporous and nonporous control were prepared. The nonporous control comprised non-laser ablated PCL—ACPCL. The microporous control comprised approximately a 6 mm×8 mm×0.62 mm piece of commercially-available Standard Wall GORETEX® tubing comprised of expanded polytetrafluoroethylene (ePTFE) and is reported to have micropores of 10-30 microns in diameter. Pore size and spacing of the exemplary SMP external support were characterized by scanning electron microscopy (SEM) as described above. (FIG. 5, FIG. 9).

To determine mechanical and shape memory properties of the SMP films, pore designs (~12 mm×~6 mm×~0.4 mm) and nonporous controls (~12 mm×~2 mm×~0.4 mm) were loaded on a tensile clamp of a dynamic mechanical analyzer (TA Instruments Q2000). The tensile mechanical properties were determined isothermally at 37° C. using a stress ramp of 0.1 MPa sec$^{-1}$. The initial slope of the stress vs. strain curve was used to determine the modulus at 37° C., $E_{tm}$(37° C.). (FIG. 10). The Young's modulus of both nonporous (2.4±0.86) and porous (mean=0.57-1.11 MPa) PCL-ACPCL designs may be close to the average physiological modulus of healthy human coronary arteries (1.48 MPa), suggesting suitability of the designs for vascular and soft tissue applications from a mechanical perspective. Ablating pores in the crosslinked polymer designs resulted in significant decreases in $E_{tm}$(37° C.) and $\sigma_{max}$ for all of the designs (p<0.003). Decreasing the spacing of the pores from 229±51 µm (C,D) to 151±51 µm (A,B) further reduced both $E_{tm}$(37° C.) and $\sigma_{max}$. Poor spacing may be a better predictor of mechanical properties than pore size.

Figure 11:
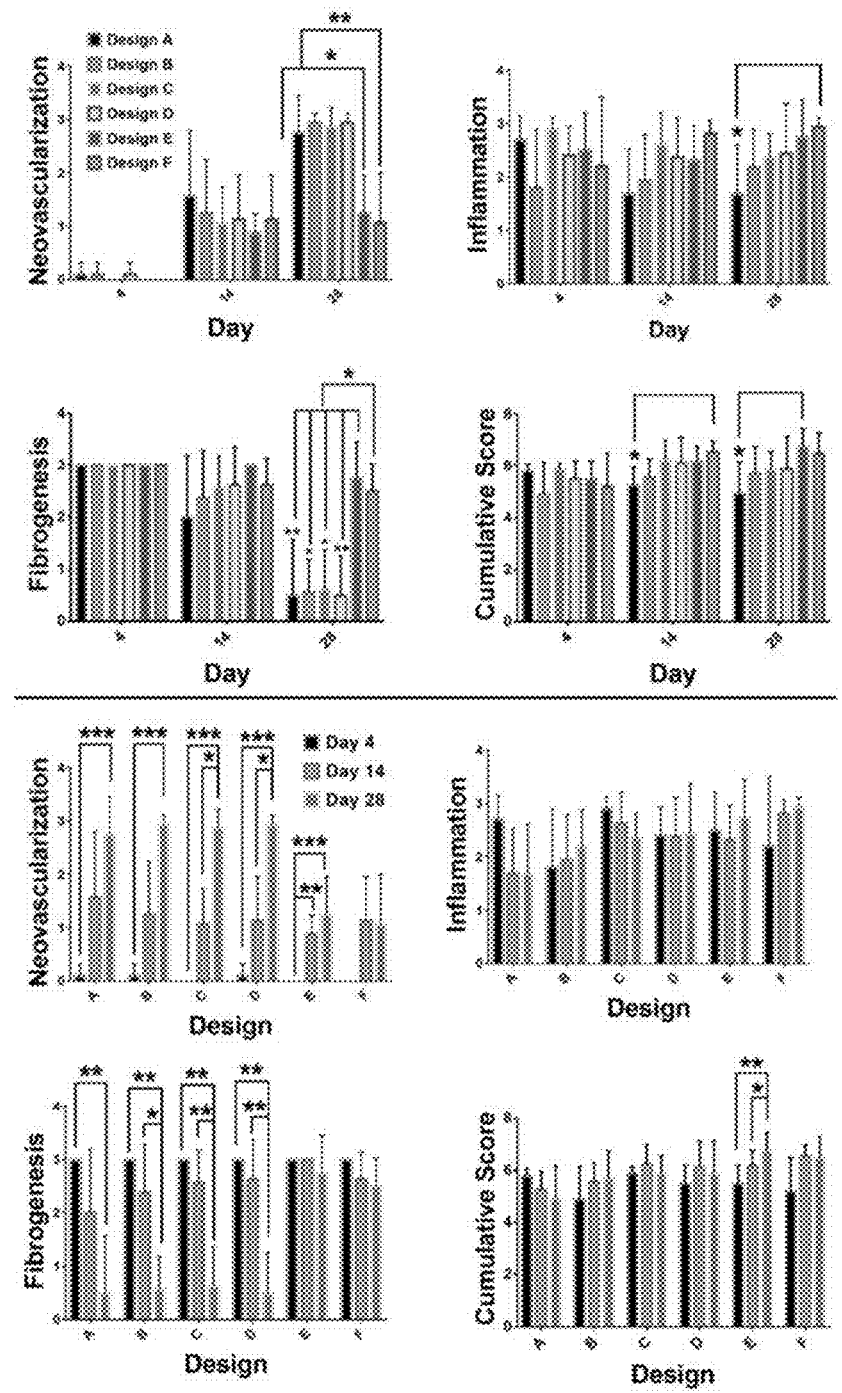
FIG. 11 is a summary of histological scores of a porous scaffold embodiment of the present disclosure.

To determine the respective effect on neovascularization, inflammation, and fibrosis, the porous and nonporous designs were utilized in the same histological scoring schematic of FIG. 4, but this Example utilized time points of Day 4, Day 14, and Day 28. Based on the histological scoring, higher spaced designs (~230 microns) had less intense inflammation than the lower spaced designs (~150 microns). (FIG. 11).

Example 4

To assess and compare neovascularization responses of embodiments of the present disclosure, a microvessel detection algorithm was run that quantified the total number of vessels, total and average vessel area, average vessel perimeter, and microvessel density by colorimetrically detecting DAB that was used to stain against CD31. To quantify neovascularization, deparaffinized slides were first incubated with anti-CD31 (Cat. #DIA-310, Dianova, Hamburg, Germany) for one hour at a 1:100 dilution, then with a biotinylated rabbit anti-rat secondary antibody (Cat. #BA-4000, Vector Laboratories, Inc., Burlingame, Calif.) for 15 minutes at a 1:200 dilution. The Bond Polymer Refine detection system was used for visualization. Slides were dehydrated, cleared and cover slipped before digitally imaging and scanning with an Aperio Versa 200 automated scanning microscope connected to a Leica SCN400 scanner (Leica Microsystems, Wetzlar, Germany). Using the Digital Image Hub, a web-based digital slide-viewing tool provided by the Digital Histology Shared Resource (DHSR) at Vanderbilt University, slides were imaged and quantified for neovascularization via modification of a pre-established, colorimetric-based DAB Microvessel Detection algorithm. The algorithm was optimized and regions of interest (ROIs) were drawn with the aid of a board-certified veterinary pathologist experienced in digital pathology. Algorithm specifications and ROIs were established to maximize specificity for the formation of new blood vessels contained within the tissue reaction site in close proximity (within a few hundred microns) of the polymer surface. Positive background staining of non-vascularized tissue, the polymer surface, and highly-organized, preexisting vessels were excluded from detection as much as possible. Specifications of the algorithm enables exclusion of vessels that are insignificantly small (<60 pixel) or too large in size (>5000 pixel) or aspect ratio (>1000) to be considered representative of a newly formed blood vessel. The algorithm computed total number of vessels, total and average vessel area, average perimeter, and microvessel density.

Figure 12:
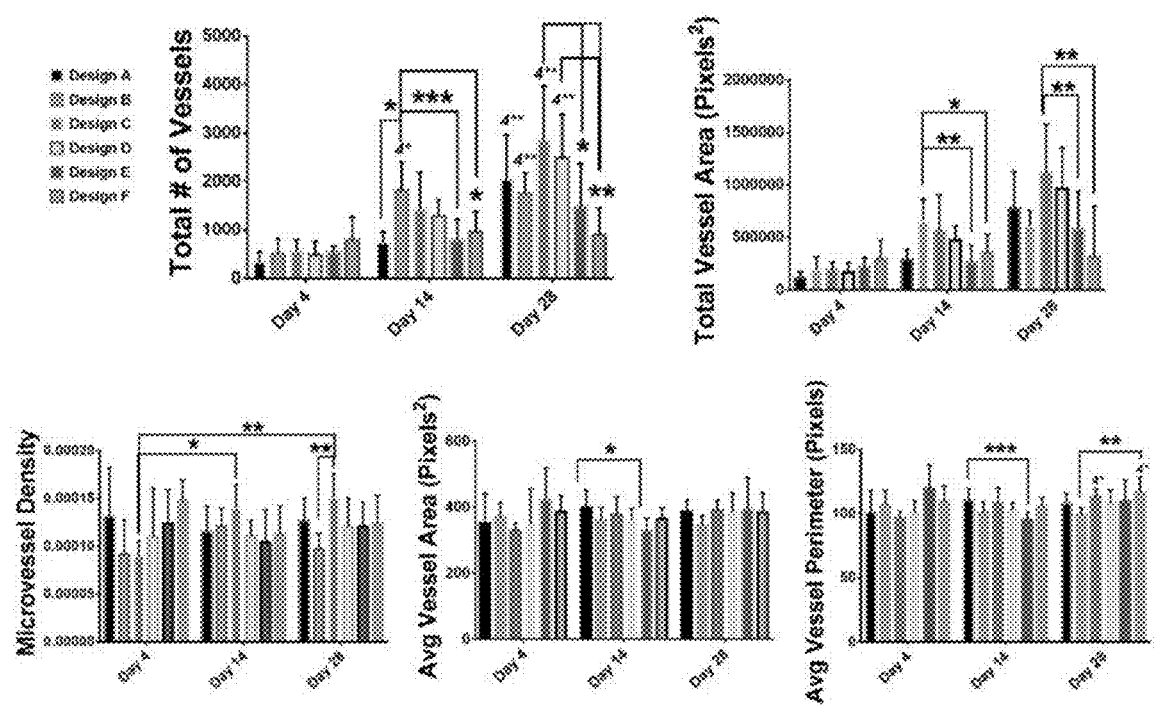
FIG. 12 is a summary of CD31 quantification of neovascularization of a porous scaffold embodiment of the present disclosure.

The same SMP designs were used as in Example 3 along with the same 4, 14, and 28 Day timepoints. It was determined that an external support with approximately 640-micron pores and a pore spacing of approximately 230 microns generated to greatest neovascularization in terms of total number of vessels, vessel area, and vessel density. (FIG. 12).

Example 5

To assess and compare macrophage phenotype characterization of embodiments of the present disclosure, a pan macrophage marker (F4/80), M1 macrophage marker (iNOS), and M2 macrophage marker (CD206) were utilized to characterize macrophage phenotypes of histiocytes observed to be present within tissue constructs to varying degrees, from minimal and part of a foreign body cellular response affecting less than half of the implant circumference, to more marked and part of the formation of a thick cuff around the circumference. Primary antibodies against F4/80 (pan macrophage marker), CD206 (M2 macrophage marker), and iNOS (M1 macrophage marker) were used. Stained slides were digitized using a Pannoramic 250 scanner. A board-certified veterinary pathologist experienced in digital pathology performed tissue image analysis in Aperio ImageScope using the Positive Pixel Count v9 algorithm. All slides were interpreted blinded to experimental conditions. For each antibody, the algorithm was optimized in positive control tissues (primarily mouse spleen, lung, and skin) before applying to the polymer-tissue specimens. For each tissue section, ROIs ranging from 1-12 total per specimen were defined prior to analysis. Depending on chronicity of the tissue response, the 50-150 µm surrounding an implant was selected for analysis, specifically excluding any undesired positively labeled structures or artifacts such as hair shafts or nonspecific DAB staining of the polymer material. Parameters reported for each specimen represent measures of positivity, which approximates the expression of a given protein within a tissue section. The output of positivity was defined for a given ROI as:

$$\% \text{ Positivity} = \frac{\text{Total \# of moderately or strongly positive pixels}}{\text{Total \# of pixels}} \times 100\%$$

Depending on the signal to noise ratio of the stain, weakly positive pixels were also included as positive in some of the samples. Macrophage phenotype was further characterized by the ratio of M2 (CD206+) to M1 (iNOS+) cells:

$$M2:M1 = \frac{\text{\# of } M2 \text{ cells}}{\text{\# of } M1 \text{ cells}}$$

Macrophages are phagocytic cells that are central to the inflammatory response as they are recruited to damaged or disrupted tissue sites through chemotaxis. They secrete a vast array of stimulating factors themselves to regulate the inflammatory response in a number of ways. Depending on their function as a pro-inflammatory or wound healing stimulator, they tend to be classified into two broad categories, pro-inflammatory M1 and pro-wound healing M2, but also have several subset phenotypes and are quite fluid in nature. In general, it is understood that a shift from a "classically-activated," pro-inflammatory M1 macrophage phenotype to an "alternatively-activated," pro-tissue remodeling M2 macrophage phenotype indicative of constructive wound healing responses such as neovascularization. Although macrophage phenotype characterization of external supports is currently underexplored and largely unknown, it is hypothesized that this shift from M1 to M2 over 28 days is desirable to fully resolve tissue and promote neovascular effects that are favorable towards reducing neointimal hyperplasia. For example, a recent study evaluating murine laser-induced choroidal neovascularization demonstrated that new blood vessel formation correlated with a transient upregulation in M1 phenotype followed by a sustained shift to M2. However, macrophage phenotypes exist across a diverse spectrum and some recent studies have found that both M1 and M2 phenotypes are significantly upregulated in scaffolds such as glutaraldehyde-crosslinked ones that exhibited an increase in new blood vessel formation after 10 days when implanted in subcutaneous mouse tissue Inflammation has been shown to be beneficial for neovascularization, such as when bone marrow mononuclear cells (BMCs) promoted early monocyte recruitment by secreting significant amounts of monocyte chemoattractant protein-1, which help tissue engineered vascular grafts (TEVGs) transform into functional neovessels. In most contexts, ePTFE is a relatively inert polymer owing to its strong carbon-fluoride bond and non-degradability. In its microporous format, it exhibited minimal adhesion with a mean implantation lifetime of 420 days after laparoscopic ventral hernia repair in 65 repoerative patients, and it also reduced adhesions in a rabbit peritoneal model of laparoscopic ventral hernia repair relative to polypropylene and HA/polypropylene meshes. It did not promote the substantial inflammatory and neovascularization response that Dacron external meshes did when applied to porcine vein grafts and was ineffective in this context while Dacron meshes correspondingly reduced neointimal formation. Meanwhile, the specific roles that macrophages play in fibrogenesis are largely unknown, but fibrotic lesions are accompanied by a high degree of chronic inflammatory cell infiltration where monocytes and macrophages are present. ePTFE also exhibited less neovascularization and fibrogenesis than the PCL-ACPCL scaffolds in this study, so it was anticipated that it would have less macrophages.

Figure 13:
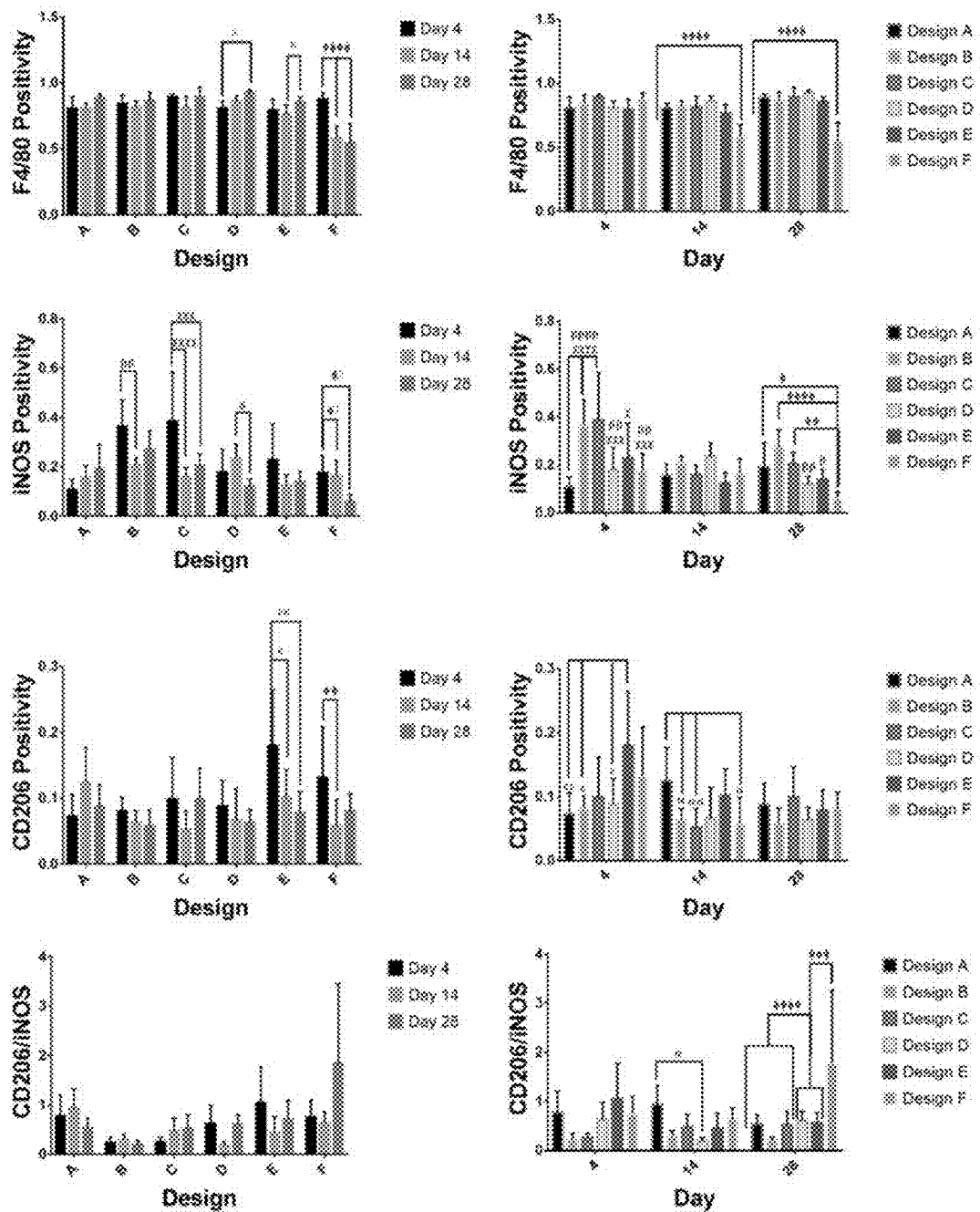
FIG. 13 is a summary of Macrophage Phenotype characterization of a porous scaffold embodiment of the present disclosure.
Figure 19A:
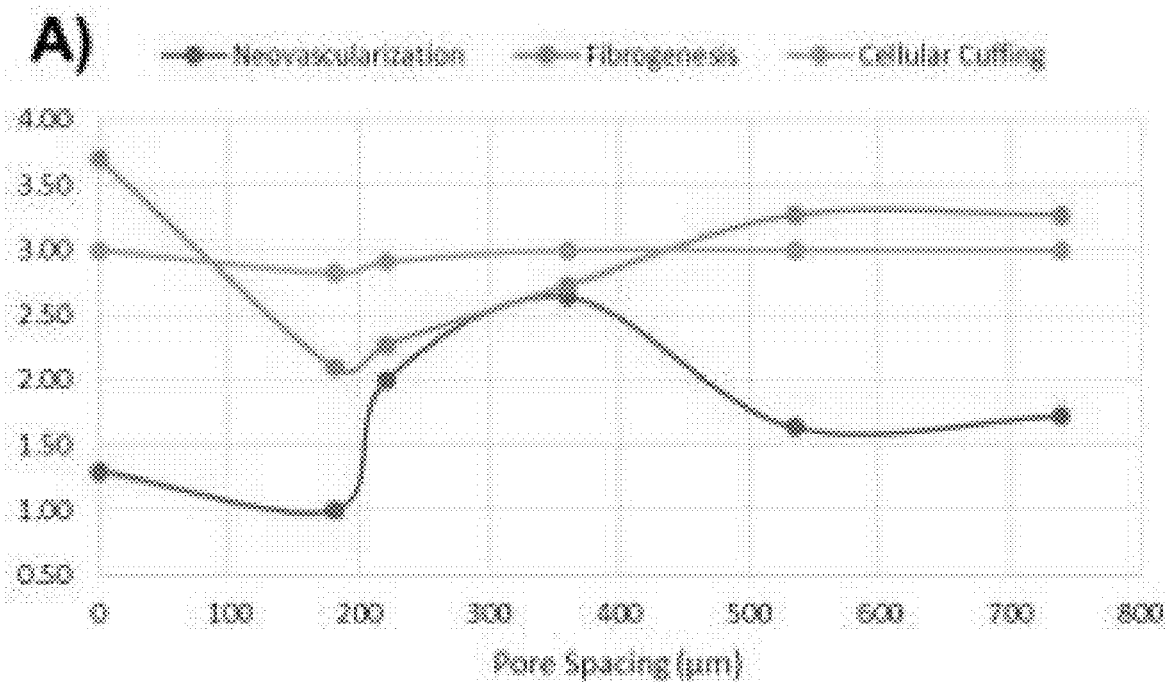
FIG. 19A illustrates the impact of varying pore spacing on neovascularization, fibrogenesis, and cellular cuffing between test articles (from left to right) TA6, TA1, TA2, TA3, TA4, and TA5.
Figure 19B:
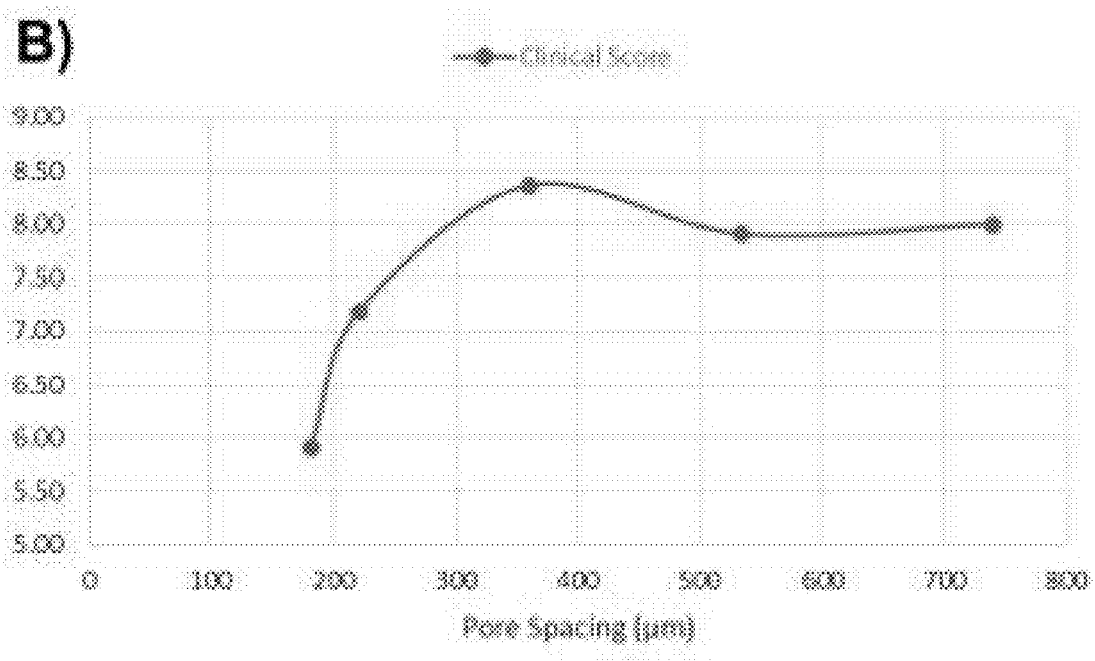
FIG. 19B illustrates the impact of varying pore spacing on the overall clinical (cumulative) score between test articles (from left to right) TA1, TA2, TA3, TA4, and TA5.
Figure 20A:
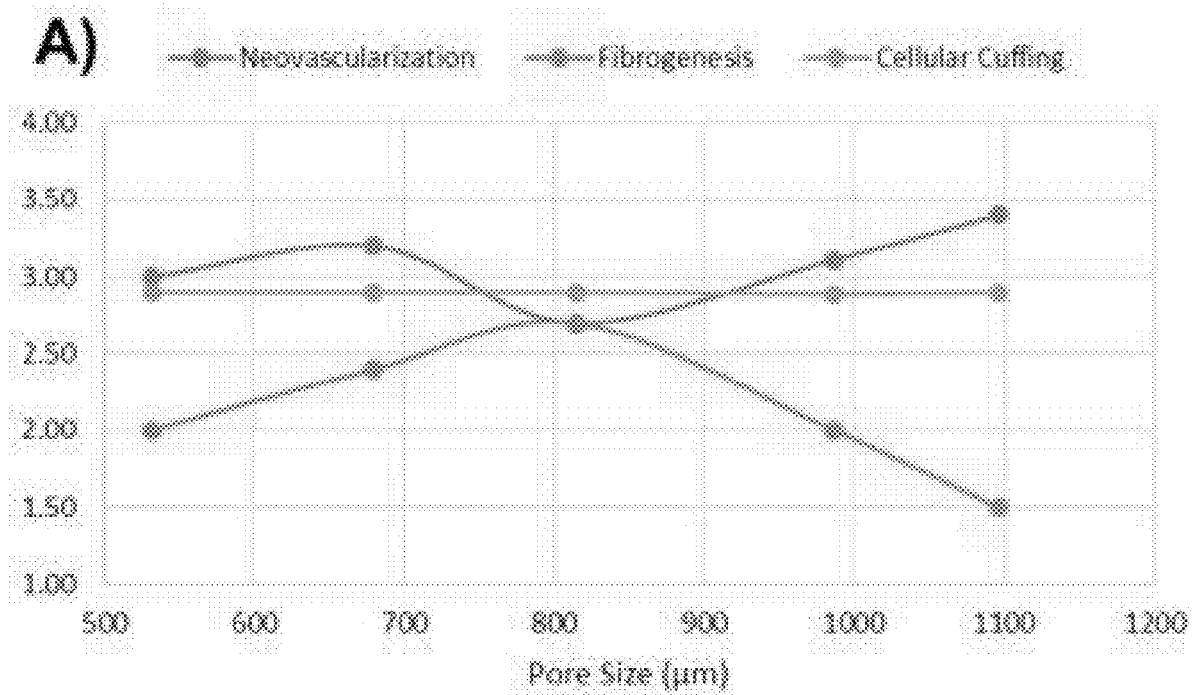
FIG. 20A illustrates the impact of varying pore spacing on neovascularization, fibrogenesis, and cellular cuffing between (from left to right) TA10, TA11, TA8, TA12, and TA13.
Figure 20B:
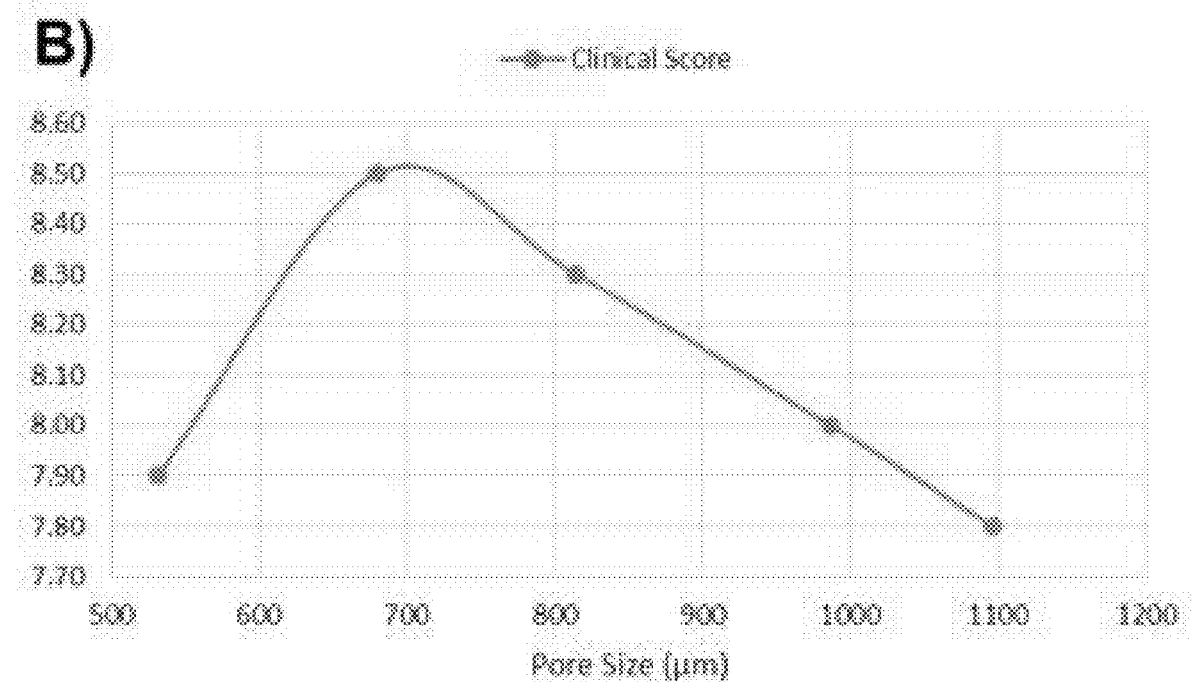
FIG. 20B illustrates the impact of varying pore spacing on the overall clinical (cumulative) score between (from left to right) TA10, TA11, TA8, TA12, and TA13.

As shown in FIG. 13, the iNOS positivity was significantly lower for Design A relative to Designs B and C, which implies that larger pore sizes and spacings may promote an M1 macrophage phenotype at early timepoints; this transient upregulation of an M1 phenotype at early stages has been shown to promote neovascularization. Conversely, scaffolds which promote an eventual switch toward an M2 macrophage phenotype are expected to fully resolve their wound healing process. On Day 28, Design D had significantly lower iNOS positivity than Design B, which implies that the wider-spaced design (D) may better promote wound healing resolution. Combining staining data of groups based on equivalent pore size and spacing revealed some interesting insights with regards to this characterization of macrophage phenotype. On Day 14, smaller pores (A+C, 635 µm diameter) exhibited significantly greater CD206 positivity (mean difference=0.0452, p=0.141), lower iNOS positivity (mean difference=-0.0655, p=0.0017), and a higher CD206/iNOS ratio (mean difference=0.463, p=0.0004) than larger pores (B+D, 1160 µm diameter). On Day 28, smaller pores again were more positive for CD206 (mean difference=0.0322, p=0.0147), while larger spacings (C+D, 230 µm) had significantly lower iNOS positivity (mean difference=0.0687, p=0.0304). No differences were detected for F4/80 positivity. Taken together, this implies that the ~635 µm diameter, ~230 µm spacing group (Design C) elicits an inflammatory response characterized by more of the "tissue remodeling" M2 phenotype. This also coincides with the design exhibiting the greatest amount of neovascularization as measured by total blood vessel number, total vessel area, and microvessel density by the CD31 microvessel detection algorithm.

Example 6

To assess the wound healing process of embodiments of the present disclosure, matrix metalloproteinases (MMPs) were analyzed through staining to detect localization to the polymer-tissue interface. Tissue sections containing the polymer-tissue interface were immunohistochemically stained for MMPs 3, 9, 12, 13, and 14, as all of these MMPs were detected from proteomics analysis of tissue extracts and are known to play a role in the wound healing process. Cells labeled positively for MMPs are separated into those observed immediately adjacent to the implant (within approximately 100 µm distance) and the associated reactive neotissue ("peri-polymer localization"), and those observed at a greater distance, separated by a fascial plane ("other cells labeled"). (FIG. 14). For each, cell types are listed from strongest/most intense staining to weakest/least intense staining. Granular, cytoplasmic staining for MMPs was observed in several cell types in the experimental tissue specimens, but notably co-localized with macrophages peripheral to the polymer-tissue implant the strongest of any other cell type. This implies that MMPs are secreted by macrophages that infiltrate the polymer-tissue interface. MMP-9 primarily digests gelatin and has been shown to be secreted in high levels by M2 macrophages known to promote angiogenesis, especially by the M2c subgroup. MMP-3 and MMP-9, along with MMP-1, are known to regulate the most widespread array of chemokine signals that are important drivers of the inflammatory response. IHC staining of MMP-9 co-localized with monocyte/macrophages and multinucleated giant cells, as did all of the MMPs. (FIG. 15).

Example 7

To assess the cellular and protein response of embodiments described herein, a proteomics analysis was done to determine protein regulation and responses. Sections of the tissue-scaffold explants were immediately placed in a cryovial and submerged for approximately 1 minute to flash freeze the tissue. Samples were then kept on dry ice for a short period of time before transferring to a −80° C. freezer. Tissue samples were then thawed, immediately cut finely with a sterile surgical blade, and submerged in an NP-40 lysis buffer cocktail (10 mL of 50 mM Tris, 150 mM NaCl, pH 7.8 with 1% NP-40 added to protease inhibitor cocktail P2714-10TL from Sigma) under sonication for 2-3 minutes. The turbid solution was spun down at 2000 g for 2 minutes and the supernatant was transferred to a separate vial for storage at −80° C. Protein concentrations of the lysed tissue samples were determined by BCA assay.

Protein homogenates (50 ug) were precipitated with ice-cold acetone overnight at −20° C. The samples were centrifuged at 14,000 g at 4° C. for 30 minutes, and the precipitated protein pellets were washed with cold acetone, dried, and reconstituted in 500 mM Tris with 50% Trifluoroethanol (TFE). Protein lysates were reduced with TCEP and available cysteine residues were alkylated with Iodoacetamide. Next, lysates were diluted 10-fold with Tris to obtain a final concentration of 10% TFE, and proteins were digested with sequencing-grade trypsin at 37° C. overnight.

Following digestion, protein digests were diluted 9-fold with 0.1% formic acid and each sample was analyzed by LC-coupled tandem mass spectrometry (LC-MS/MS). An analytical column (360 μm O.D.×100 μm I.D.) was packed with 24 cm of C18 reverse phase material (Jupiter, 3 um beads, Phenomenex) directly into a laser-pulled emitter tip. Peptides aliquots (1.2 ug of digested protein) were loaded on the capillary reverse phase analytical using a Dionex Ultimate 3000 nanoLC and autosampler and were introduced via nano-electrospray into a Q Exactive Plus mass spectrometer (Thermo Scientific, San Jose, Calif.). Each sample was analyzed using a 2-hour LC gradient. The Q Exactive Plus was operated in data-dependent mode, and the instrument method consisted of an MS1 scan following by up to 20 HCD MS/MS scans. Normalized collision energy was set to 27, dynamic exclusion was set to 30 s, and peptide match and isotope exclusion were enabled.

Comparisons of relative peptide and protein amounts were performed using MaxQuant-LFQ software. It utilizes full-scan peptide intensity determination and normalization both within and across samples. Missing values were imputed and cross group significance estimated via t-test with benjamini-hochberg correction for multiple testing. For simplicity of comparison, macroporous designs A-D were grouped together and compared against non/microporous group designs E-F. (FIG. 16).

Example 8

To assess the efficacy of embodiments disclosed herein, a study was conducted to evaluate the feasibility, vessel and healing response, and performance of a porous external support device wherein the external support device may have a heterogeneously-porous surface such that the surface may have a first region that is proximal to a native vein or artery and a second region which is proximal to the graft. In this study, a bilateral jugular vein-to-carotid artery experimental ovine model of arteriovenous grafts (AVGs) was used, in which the left, cranial venous anastomosis was treated with a porous external support device, and the right caudal venous anastomosis was untreated as a sham control.

The porous external support devices utilized in the AVG ovine model study included a first portion and a second portion of the device which had different porosities (See FIGS. 21A and 21B). The first portion, surrounding the native vein, included a pore size of about 700-800 microns, or more preferably about 750-800 microns, or more preferably about 777 micron (777±72 μm), and a pore spacing of about 300-400 microns, more preferably about 300-350 microns, or more preferably about 328 microns (382±45 μm). The second portion, surrounding the graft, included a pore size of about 900-1000 microns, or more preferably about 900-950 microns, or more preferably about 913 microns (913±38 μm), and a pore spacing of about 600-700 microns, more preferably about 600-650 microns, or more preferably about 632 microns (632±13 μm).

Prior to excision of the vessels, the AVGs (treated and untreated) were cannulated upstream of the treatment sites and rinsed with isotonic solution until adequate clearance of blood was achieved. The AVGs were excised with a minimum of 5 cm of vasculature proximal and distal to the treatment site, anatomy permitting, with a focus on the vein-graft interface. The AVGs were fixed in 10% neutral-buffered formalin (NBF), trimmed, embedded in paraffin, sectioned at 5-7 μm, and stained with H&E for histopathological and histomorphometric assessments. Various measurements were made using a calibrated Aperio Imaging system using scanned whole slide images and ImageScope software. Lumen area was directly measured on the lumen surface of the vein and graft. To measure the internal elastic lamina (IEL), which is indistinct in most veins, the innermost edge of the smooth muscle layer of the vein wall was outlined and measured. For the outside area of the vein, the outer edge of the smooth muscle in the vein was measured since the vein does not have a distinct external elastic lamina. The innermost edge of the graft was measured to determine the outside area of the tissue within the graft.

Histopathology results showed that at anastomosis sites, the connected lumens of the graft and vein were patent except for one animal in which the graft lumen was occluded. The vein and graft were variably surrounded (usually up to 10 mm from the anastomosis) by one or two layers of the wrap. The graft lumen contained variably thick, mature neointima/fibrovascular tissue (average area stenosis on wrapped left side, nonpatent animal that was sacrificed at 14 days excluded, was 21.1%; area stenosis on the non-wrapped right side, animal excluded was 42.9%). This greater than 50% reduction in stenosis area at the anastomosis graft was statistically significant (p<0.0001). Intimal area was also significantly reduced at the anastomosis graft (p=0.035), a further indication that the porous external support device is significantly reducing inward remodeling at the anastomosis. Endothelium lined the neointima inside the graft. Graft material was infiltrated with low numbers of spindle-shaped cells (capillaries, fibroblasts) and surrounded by 1-2 mm of mature connective tissue. On the left side, the mature connective tissue around the graft extended to and blended with connective tissue around the wrap. On all sides, the edges of the graft were lined by low numbers of macrophages, some multinucleated.

At the anastomosis sites, the vein wall was intact, and veins were usually widely patent with little area stenosis (left side with wrap <1% area stenosis; right side without wrap <3% area stenosis). When present in the lumen of left and right anastomoses, the neointima was mature, inflammation was minimal to absent in the neointima, and endothelium covered the lumens. At the anastomosis site, the vein wall was incorporated into mature connective tissue that surrounded the veins on the right side (no wrap) or extended from the vein to the wrap on the left side. On average, approximately 1.8 mm (range <1 mm up to 3.5 mm) of mature connective tissue separated the wrap and vein wall. The wrap was immediately surrounded by mature connective tissue that contained low numbers of macrophages, some multinucleated. Peripheral to the anastomosis on both left and right sides, veins cranial to the anastomosis sites (towards the head) had little average area stenosis (left side with wrap <3% area stenosis; right side without wrap no area stenosis). Veins caudal to the anastomosis sites (towards the heart) had slightly more average area stenosis (left side with wrap 6.2% area stenosis; right side without wrap 4.7% area stenosis). In general, the sections closest to the anastomosis had more area stenosis than more peripheral sections of vein. Vein sections farther from the anastomosis site were usually markedly folded and empty. Inflammation was minimal to absent, and thrombi were not found.

Anastomoses with and without support devices were patent (except the graft in the excluded animal). Vein walls were often fibrotic, but neointimal formation was mild. Overall, inflammation was mild and composed of macrophages around the graft and wrap materials. The wrap was surrounded by mature connective tissue. Grafts were onefifth to one-half filled with mature neointima/fibrovascular tissue. There was no evidence of thrombosis, aneurysm, rupture or blood leakage in the grafts, veins, or anastomoses.

Treatment of AVGs as disclosed herein significantly reduced the stenosis area as well as the intimal area at the anastomosis graft at 60 days, indicating that it may be effectively mitigating neointimal hyperplasia and inward remodeling at the anastomosis of AVGs. Neointimal hyperplasia that leads to stenosis at the venous anastomosis is the primary culprit of primary and cumulative patency loss in the AVGs used by ESRD patients. Treatment with porous support devices did not significantly impact flow parameters nor vessel sizes, although there was a trend for less of an increase in jugular vein ID with application of the device around the jugular-AVG. These trends are consistent with ovine AVF chronic studies as well as rabbit bypass grafting studies that demonstrate a significant reduction in neointimal hyperplasia with similar embodiments disclosed herein applied. This chronic AVG study supports the central hypothesis that a perivascular wrap with mechanical compliance similar to that of a healthy artery can mitigate neointimal hyperplasia and potentially improve AVF and AVG surgical outcomes in ESRD patients.

Example 9

To further assess the effect of various pore size and spacing combinations, a study was conducted to determine maximal infiltrative neovascularization while minimizing fibrogenesis. As part of the study, 8 perivascular wrap pore designs ranging from 531-1096 µm in pore size and 225-420 µm in pore spacing (TA7-TA14) were evaluated in the second rat cohort. (See FIG. 17). Results indicate that all of these pore designs are potentially viable options with clinical scores higher than all of the control articles, and there is some level of a tradeoff between promoting more neovascularization and inducing more fibrogenesis. Nonetheless, the 680 µm-sized, 310 µm-spaced pore designs (680/310/43%, TA11) tied for the second-highest neovascularization score (3.20±0.42) with a reasonably low amount of fibrogenesis (2.40±0.42, 4th highest fibrogenesis score out of the 8 designs tested in the second cohort) and the highest clinical score (8.50±0.71). This was followed closely by TA9 (836/420/40%, 8.40±0.84), TA3 (542/360/33%, 8.36±0.67), TA7 (778/225/55%, 8.30±0.82), TA8 (815/326/46%, 8.30±0.67), and TA14 (777/328/45%, 8.20±0.79). The choice between these six perivascular wrap designs is dependent upon the relative value of enhancing neovascularization versus reducing fibrogenesis, as well as other factors such as the impact on mechanical properties from porosity.

It should be noted that the perivascular wraps disclosed above for Example 9 had a higher clinical score than FDA-approved hernia repair meshes (Cook Medical Biodesign® Hernia Graft, Bard Phasix™ Mesh, Covidien Versatex Monofilament Mesh, Gore® Synecore Intraperitoneal Biomaterial), a nitinol stent (Abbott Xact Carotid Stent), and a Goretex graft. All of the top disclosed designs perform favorably over the control articles. The perivascular wraps had significantly greater infiltrative neovascularization than the Goretex graft tubing. Compared to the hernia repair meshes and the nitinol stent, SelfWrap had similar yet slightly greater neovascularization with significantly less infiltrative fibrogenesis and comparable or lower cellular cuffing as an indication of overall inflammatory responses. While this was only evaluated at one timepoint—30 days—and long-term responses could change based on varied degradation timelines, this result suggests that the perivascular wraps as disclosed herein may achieve similar or higher levels of neovascularization than other materials on the market, but with less fibrosis and overall inflammation. Implications of this may be better outcomes for hemodialysis, PABG/CABG, and other patients.

It will be understood that various details of the presently disclosed subject matter can be changed without departing from the scope of the subject matter disclosed herein. Furthermore, the description provided herein is for the purpose of illustration only, and not for the purpose of limitation.

While the terms used herein are believed to be well understood by one of ordinary skill in the art, the definitions set forth herein are provided to facilitate explanation of the presently disclosed subject matter.

Unless defined otherwise, all technical and scientific terms used herein have the same meaning as commonly understood by one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

The terms "comprising", "including," and "having" are intended to be inclusive and mean that there may be additional elements other than the listed elements.

Following long-standing patent law convention, the terms "a", "an", and "the" refer to "one or more" when used in this application, including the claims. Thus, for example, reference to "a polymer" includes a plurality of such polymers, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently disclosed subject matter.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Throughout this document, references are mentioned. All such references are incorporated herein by reference.

Thus, although there have been described particular embodiments of the present invention of a new and useful POLYMERIC VASCULAR GRAFTS WHICH INDUCE NEOVASCULARIZATION WITH MILD TO MINIMAL INFLAMMATION AND PROMOTION OF FIBROVASCULAR TISSUE it is not intended that such references be construed as limitations upon the scope of this invention except as set forth in the following claims.

What is claimed is:

1. An implantable tissue supporting device comprising:
   a biodegradable polymeric scaffold capable of surrounding a tissue, the biodegradable polymeric scaffold includes at least one polymer, the at least one polymer comprising at least one monomer that is crosslinkable, wherein the biodegradable polymeric scaffold is configured to have a melting temperature and be moldable from a first shape to a second shape by an external force when the melting temperature is met or exceeded, wherein the device is mechanically compliant at from about 20° C. to about 50° C., and wherein the biodegradable polymeric scaffold has a pore size of about 800-900 μm and a pore spacing of about 300-450 μm.

2. The device of claim 1, wherein the scaffold has a pore size of about 800-850 μm, and a pore spacing of about 325-425 μm.

3. The device of claim 1, wherein the scaffold has a pore size of about 815 μm, and a pore spacing of about 326 μm.

4. The device of claim 1, wherein the scaffold has a pore size of about 836 μm, and a pore spacing of about 420 μm.

5. The device of claim 1, wherein the at least one monomer is allyl functionalized and comprises an allyl carboxylate group.

6. The device of claim 1, wherein the at least one monomer comprises ε-caprolactone.

7. The device claim 1, wherein the biodegradable polymeric scaffold comprises a plurality of crosslinked polymers, the plurality of crosslinked polymers comprising a poly (ε-caprolactone)-co-(α-allyl carboxylate ε-caprolactone) polymer.

8. The device of claim 1, wherein the device forms a seamless and sutureless sheath and has resilient radial expression in a manner that mimics the compliance properties of said tissue.

9. The device of claim 1, wherein the biodegradable polymeric scaffold further comprises a shape memory polymer and has a melting temperature at or near 37° C.

10. The device of claim 1, wherein the biodegradable polymeric scaffold comprises the at least one monomer that is photocrosslinkable and further comprises at least a second monomer that is not photocrosslinkable.

11. An implantable tissue supporting device comprising:
a biodegradable polymeric scaffold capable of surrounding a tissue, the biodegradable polymeric scaffold includes at least one polymer, the at least one polymer comprising at least one monomer that is crosslinkable, wherein the biodegradable polymeric scaffold is configured to have a melting temperature and be moldable from a first shape to a second shape by an external force when the melting temperature is met or exceeded, wherein the device is mechanically compliant at from about 20° C. to about 50° C., and wherein the biodegradable polymeric scaffold has a pore size of about 650-800 μm and a pore spacing of about 300-400 μm.

12. The device of claim 11, wherein the scaffold has a pore size of about 650-780 μm, and a pore spacing of about 300-350 μm.

13. The device of claim 11, wherein the scaffold has a pore size of about 680 μm, and a pore spacing of about 328 μm.

14. The device of claim 11, wherein the scaffold has a pore size of about 777 μm, and a pore spacing of about 310 μm.

15. The device of claim 11, wherein the at least one monomer is allyl functionalized and comprises an allyl carboxylate group.

16. The device of claim 11, wherein the at least one monomer comprises ε-caprolactone.

17. The device claim 11, wherein the biodegradable polymeric scaffold comprises a plurality of crosslinked polymers, the plurality of crosslinked includes comprising a poly (ε-caprolactone)-co-(α-allyl carboxylate ε-caprolactone) polymer.

18. The device of claim 11, wherein the device forms a seamless and sutureless sheath and has resilient radial expression in a manner that mimics the compliance properties of said tissue.

19. The device of claim 11, wherein the biodegradable polymeric scaffold further comprises a shape memory polymer having a melting temperature at or near 37° C.

20. The device of claim 11, wherein the biodegradable polymeric scaffold comprises the at least one monomer that is photocrosslinkable and further comprises at least a second monomer that is not photocrosslinkable.

* * * * *